United States Patent
Watson

(10) Patent No.: US 6,581,045 B1
(45) Date of Patent: *Jun. 17, 2003

(54) ASSET MANAGEMENT SYSTEM FOR ANALYZING THE CONDITION OF ASSETS AND EVALUATING REPAIR/REPLACEMENT OPTIONS

(75) Inventor: James R. Watson, Plymouth, MI (US)

(73) Assignee: Building Technology Associates, Inc., Oak Park, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/449,077

(22) Filed: May 24, 1995

Related U.S. Application Data

(63) Continuation of application No. 07/949,747, filed on Sep. 23, 1992, now abandoned, which is a continuation of application No. 07/816,843, filed on Dec. 31, 1991, now abandoned, which is a continuation of application No. 07/351,922, filed on May 12, 1989, now abandoned.

(51) Int. Cl.[7] .............................................. G06F 17/00
(52) U.S. Cl. ...................................................... 705/400
(58) Field of Search .......................... 364/401 R, 406; 395/235; 705/400, 1, 5, 16; 235/7, 61

Primary Examiner—Ayaz R. Sheikh
Assistant Examiner—Xuong Chung-Trans
(74) Attorney, Agent, or Firm—Varnum, Riddering, Schmidt & Howlett LLP

(57) ABSTRACT

An asset management system (100) is disclosed, and is adapted for use to rate the condition of a physical asset component, such as a roof (102), estimate the service life of the asset, and provide a basis for decisions regarding the selection of repair alternatives and/or replacement options associated with the asset. Rating and evaluation of the asset is initiated by an operator (104) performing a "survey" of the asset to determine problem defects. Data representative of such defects is entered into the memory of an instrument (106) and transmitted to a central processing system (108). The central processing system (108) is adapted to allow the user to selectively review and evaluate the impact and financial feasibility of alternative repair and replacement options relating to the problems or defects associated with the asset.

4 Claims, 14 Drawing Sheets

C: PANGELS.TXT FC=1 FL=1 COL 01

<A>
PANGLES
PANGLES, 31 W. SAN PADROS, SAN JOSE CA. 95128, RUSS WATSON, 09/22/86, JOSE NITEZ, MA
1, RETAIL, 1980, 100000, NONE,,NONE,,WOOD,.3,NO,,BASE,MOPPED, NONE,
    0,0,0,N/A,MINERAL,
2.RETAIL, 1985,12860,NONE,,NONE,,WOOD,BARREL,NO,,BASE,MOPPED,NONE,
    0,0,0,N/A,MINE
3,RETAIL,1974,27963,NONE,,NONE,,WOOD,.25,NO,,SHEATHING PAPER,
    SPRINKLE MOPPED,NO
<C>
1
1,H,60
1,H,10
1,M,40
7,10
3,M,10
8,M,20
8,H,30
900,21,0,10000
TREE ADJACENT TO THIS CANOPY PERITS ACCESS TO MAIN ROOF -- SECURITY?
2
3,H,4
6,M,5
3,H,1
6,M,5
3,H,6
1HELP 2INDENT 3SET LM 4SET RM 5UNDLIN 6BLDFCE 7BEGBLK 8ENDBLK 9BEGFIL 10ENDFIL

FIG. 14

ROOF INVENTORY RECORD

Building: Tractor & Equipment Plant   Year Built: 1966·  Roof Area: Ac 2,234 Sq. Ft. Roofing System: BUR  Installed: 1966  Warranty end: 1986  Last Action: Survey Oct 87  Surface: Aggregate  Membrane: Coal tar pitch  Plys: 4  Felt: Organic  Insulation: Glass fiber  Thickness: 2-1/4 inches  Layers: two 1-1/8 inch  Attachment: Asphalt hot  Underlayment: None  Attachment: n/a  Deck: Steel  Slope: Flat  Drains: Interior  Base Flashing: 244 Lin Ft.  Type: Bituminous  Accessory Metal: none Lin. Ft.  Type: n/a ROOF CONDITION FACTOR: 49.65   SERVICEABLE LIFE: 2 Years   REPAIR COST ESTIMATES

| Type | Severity | Roof Problems Quantity | Conditions Density | Deducts | Unit Cost of Repair | Prime Leak Conditions | Other Type Conditions |
|---|---|---|---|---|---|---|---|
| 1 | High | 100 | 37.42 | 12.85 | $22.00 | $2,200 | |
| 1 | Medium | 22 | 8.23 | 3.56 | 11.48 | | $ 253 |
| 2 | High | | | | | | |
| 2 | Medium | 132 | 49.39 | 8.00 | 11.48 | | 1,515 |
| 3 | High | 1 | 4 30 | 3.58 | 11.00 | 11 | |
| 3 | Medium | | | | | | |
| 4 | | | | | | | |
| 5 | High | | | | | | |
| 5 | Medium | | | | | | |
| 6 | High | | | | | | |
| 6 | Medium | | | | | | |
| 7 | | | | | | | |
| 8 | High | 8 | .34 | 3.00 | | 34.00 | 272 |
| 8 | Medium | 7 | .30 | 2.00 | | 11.48 | 80 |
| 8 | Low | 20 | .86 | 13.91 | | 11.48 | 230 |
| 9 | High | | | | | | |
| 9 | Medium | 57 | 2.45 | 6.91 | | 11.48 | 654 |
| 9 | Low | 1,750 | 75.30 | 38.33 | | .96 | 1,680 |
| 10 | | | | | | | |

W/O LEAK CONDITIONS: Condition Factor 40.94   Serviceable Life: 3 Years   Total $2.483 $4.412

Note:

FIG. 17

ASSET MANAGEMENT SYSTEM FOR ANALYZING THE CONDITION OF ASSETS AND EVALUATING REPAIR/REPLACEMENT OPTIONS

This is a continuation of 07/949,747 Sep. 23, 1992, of Application Ser. No. 07/816,843 filed Dec. 31, 1991 which is a continuation of Application Ser. No. 07/351,922 filed on May 12, 1989 all now abandoned.

FIELD OF THE INVENTION

The invention relates to apparatus and methods for efficiently maintaining, evaluating and managing the physical state or condition of assets and, more particularly, apparatus and methods for "rating" asset conditions, estimating asset service life and providing data for facilitating alternative repair/replacement decisions.

DESCRIPTION OF THE RELATED ART

Commercial, industrial and other types of organizations must continuously be concerned about the business "condition" of their organizations. Such concerns typically involve business decisions regarding sales, marketing, advertising and numerous other issues. Also, these concerns may involve relatively "tangible" issues such as existing and future space requirements, future employee growth (or reduction), necessary equipment purchases and similar concerns. For purposes of forecasting space requirements, requisite employee hiring requirements and new equipment purchases, along with similar issues involving current and future growth and expenditures, various activities of differing "sophistication" can be undertaken.

For example, it is common for industrial and commercial establishments to undertake "forecasting" activities directed to prediction of future expectations as to the general economy and the economic expectations of the specific business in-which the individual organization is involved. In fact, a number of management consultant firms specialize in such undertakings. Also, various types of business forecasting "models" have been developed in an attempt to more accurately predict the future state of the general economy and the future state of specific types of businesses. These forecasting models are often in the form of computer software packages and the like, whereby various types of algorithms are utilized to predict future economic status, based on input data comprising various financial and demographic variables. The software packages can be in the form of computer programs licensed or sold directly to business organizations or alternatively, may comprise software packages maintained proprietary and internally by financial and other business management consultants.

Such forecasting models typically utilize a number of variables in attempting to more accurately predict future business conditions. For example, a business forecasting model for a specific organization may take into account the geographic location of the business, expected population growth around the location, "age" of the specific business or technology in which the organization is involved, parameters indicative of future product or service demands, and many other variables. Through the use of these models, it is possible for a commercial or industrial organization to predict, within finite confidence limits, the expected growth of the demand for the organization's products or services and, therefore, the expected potential growth (or reduction) of the organization's business.

More specifically, financial and other business management consultants can use the business forecast to estimate future sales of the organization's products or services, given that certain purchases of physical plant, other equipment and similar assets required for such sales are undertaken. Correspondingly, assuming certain levels of product sales or services are attained, an organization can estimate its expected revenues. Similarly, assuming certain employee growth and equipment and plant purchases, an organization can estimate future expenses relating to such items. With all this information, income, cash flow and other financial matters can be reviewed and analyzed to determine suitable activities to be undertaken by a business organization with respect to its growth.

The foregoing description of an organization's future business concerns, and the proceedings undertaken to predict the economic future and potential business growth, are relatively well known. However, in addition to concerns about space requirements, equipment purchases, employee hiring and the like commercial and industrial organizations have other "inherent" items which may have a significant impact on future expenses. Among these items is the actual physical condition of existing physical plant components.

That is, the expenses associated with repair and/or replacement of currently existing physical plant components can have a significant impact on the financial status of an organization. For example, it can be assumed that a small or medium sized business organization is involved in the assembly and manufacture of a product requiring a relatively large number of machined parts which are produced at the organization's own facilities. The facilities may thus comprise a factory or a single building of relatively large floor space. If such facilities are relatively old, significant repairs or replacement may be required of plant items such as a main heating, ventilation and air conditioning (HVAC) system. Correspondingly, the costs associated with such repairs or replacement may significantly affect the organization's financial status, notwith-standing that repair or replacement expenses may be amortized over the remaining useful life of the repaired or new system. That is, notwithstanding amortization, a business organization may be required to have a relatively large amount of cash available immediately for such repairs or replacement. It is not uncommon for typical business forecasting models to substantially "ignore" required expenditures for repair or replacement of existing plant structures.

Furthermore, with respect to repairs or replacement of plant facility components, it is not uncommon for a business organization to have a number of alternative activities available which may be undertaken. Returning to the example of the HVAC system described above, an alternative to replacement of the entirety of the system may be replacement of only a selected number of individual components of the system, with less expenditures associated with such selective replacement. Still further, the entirety of the system may be repaired, as a substitute for replacement of any substantive components. Adding another layer of complexity to the repair or replacement decision process is the further alternative of selective repair of components, with deferral of other repair options. As an example, a business organization may choose only to effect "emergency" repairs of system defects, i.e., repairs of defects which must be made immediately to avoid potential production downtime, or a similar deleterious events.

Each of the foregoing decisions may have significantly different impacts on the financial status of the business organization, relative to other potential decisions. In addition, some of the repair or replacement decisions may be financially unfeasible, given current budget restraints or lack of expected cash flow. Further, it is relatively easy for a financial planner to make a decision for repair of plant facility components, rather than replacement, in view of the fact that such repairs may "appear" to be significantly less expensive in the near future. However, if such repairs do not sufficiently increase the "useful life" of the system components, or the entirety of the plant system, the actual cost to the business organization in the long term may be substantially greater than the long-term cost of a replacement option.

A further problem exists with respect to the impact of repair or replacement decisions on the "apparent" financial status of a business organization. For example, a business-organization may have a plant facility system, such as the aforedescribed HVAC system, currently being amortized over its useful life. Immediately following the end of its useful life, and depletion of the system as an asset on the financial records of the business organization, significant repairs or replacement may be required. However, by deferring repairs or other maintenance, the business organization may be able to show an apparent "positive" effect on its financial records. That is, the "expenses" represented by asset depreciation in prior fiscal years will no longer be present after asset depletion. The effect of the deferred maintenance can thus result in an apparent (and actually erroneous) reduction of organization expenses for the current fiscal year.

It should be noted that tax and other accounting governing organizations have recognized the foregoing problems, and efforts are currently being made to develop new and more realistic procedures for evaluation and depletion of capital assets. For example, accounting procedures are being considered which would require business organizations to report "costs" of deferred maintenance. With the current accounting procedures, and with deferred maintenance following asset depletion, the "value" of a business organization can be potentially "overstated." That is, a "quick profit" can be shown by a business organization merely by deferring maintenance of significant depleted capital assets.

Keeping the foregoing in mind, it is apparent that a "model" of the current "status" or "condition" of physical plant assets would be useful in selecting among various repair or replacement options which may be undertaken. However, a first requirement for, in some manner, quantifying the "condition" of a plant facility component is to develop a procedure for "rating" the component condition. That is, it is first necessary to determine parameters representative of the physical condition of the component. Further, such parameters must be capable of, or be based upon, physically realizable measurements.

These parameters could potentially take the form of parameters representative of specific "defects" apparent from the physical appearance of the component, or the mechanical (or, even possibly, electrical) operation of a component, if the component is a machine or like device. In any event, parameters representative of component "problems" would necessarily be required to be representative of the overall component condition.

Secondly, such "problem-representative" parameters could potentially be of varying degrees. That is, assuming that a parameter relevant to and representative of the condition of a component is determined, the degree of severity of the problem parameter may have an impact on the component condition.

In addition to the requirement of quantifying the "rating" of the component condition, it would be necessary to further quantify the impact of the rating parameters on the future useful life of the component. That is, the effect of the rating parameters on future "integrity" of the component would be of necessity. Clearly, for a model to provide a basis for decision making related to alternative repair or replacement options, the effect of the parameters on "service life" must be determined.

However, one problem associated with rating the condition of a component and estimating service life based on parameter measurements is that each parameter measurement will likely affect the impact of another parameter measurement. That is, parameters or variables representative of asset condition are typically not "independent." For example, if two different types of severe defects were discovered during the measurement process, the impact on service life may have a synergistic effect, relative to the service life impact of solely one or the other defects. More specifically, impact on service life of two different types of defects could not likely be quantified merely as an additive process. Accordingly, a significant level of complexity may exist in the condition rating process with respect to multiple parameters.

Further, the impact of a "condition-indicating" parameter may be somewhat dependent on differences of "sub-elements" of similar assets. For example, when attempting to rate the condition of an HVAC system, the severity of impact on the service life of the system as indicated by the condition of electrical wiring in the system may be dependent on the operating voltage of system motors. Again, this dependency among condition-indicating parameters and the specific types of components comprising the asset adds still further complexity to the condition rating process.

To ideally rate the condition of a component, estimate service life and provide a basis to select repair or replacement options would be a relatively enormous undertaking. Such a procedure would require the capability of determining the specific and exact impact of parameters measured by ideal instrumentation on the condition and service life estimation of the component. Such measurements would necessarily include combinations of problem defects and severity levels. It is apparent that such an approach, even if feasible and physically realizable, would require very extensive and expensive research and field testing.

SUMMARY OF THE INVENTION

In accordance with the invention, an asset management system is adapted to provide an empirical quantitative analysis of the condition of a physical and structural asset, and allow a user to evaluate the effect of potential repair/replacement activities on the condition of the asset. The system includes data entry means responsive to manual or automated entry of data representative of problems or defects associated with the asset. First storage means are adapted to receive and store the data representative of the problems or defects, and also to store data representative of generic information associated with the asset.

First processing means are utilized to process the data representative of the problems or defects, and generate condition factor signals representative of a figure of merit of the condition of the asset. Second processing means are utilized to process data representative of the generic information, and generate serviceability estimate signals representative of the anticipated useful life of the asset, based upon the condition factor signals and the generic information.

Second storage means comprise financial data representative of the costs of repairs of defects of the asset, and the costs of replacements of the asset. Third processing means are responsive to input data from the user, and data stored in the first and second storage means, to generate modified condition factor and serviceability estimate signals representative of a modified figure of merit of the condition of the asset, and a modified anticipated useful life of the asset, based upon user input data representing an assumption of repairs of one or more defects, or replacement of the asset or individual components thereof. Further, the third processing means is also adapted to generate financial data representative of the financial impact of assumed repairs or replacements on the value of the asset, so as to allow the user to compare repair and replacement alternatives with respect to financial impact.

BRIEF DESCRIPTION OF THE DRAWINGS

The invention will now be described with reference to the drawings, in which:

FIG. 14 is an illustration of raw data following transmittal of the data to the asset management control system in accordance with the invention;

FIG. 17 is an illustrative output listing of a roof inventory record by the asset management control system in accordance with the invention.

DESCRIPTION OF THE PREFERRED EMBODIMENTS

Figure 1:
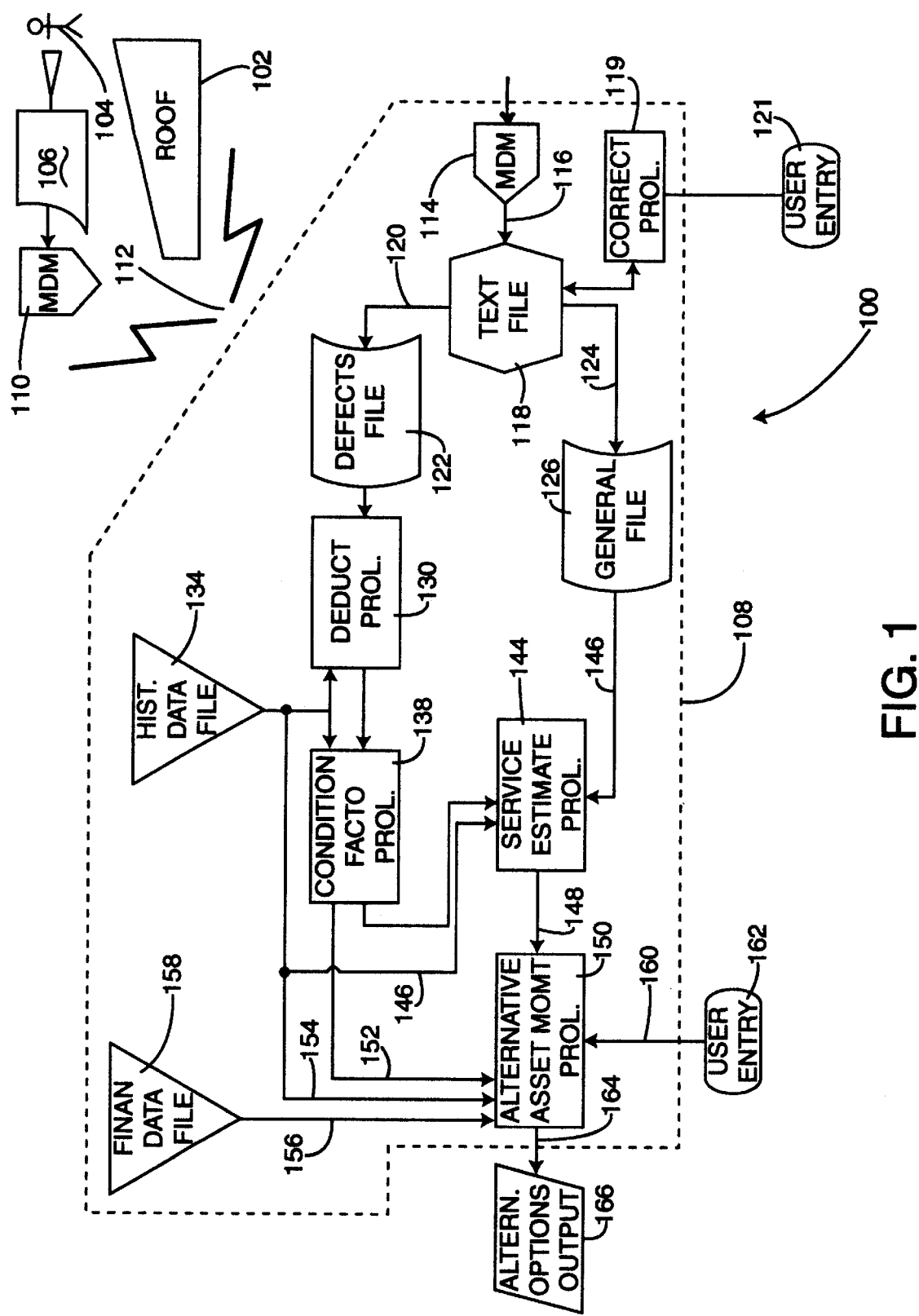
FIG. 1 is a partially structural and partially functional block diagram of an illustrative embodiment of an asset management system in accordance with the invention.

The principles of the invention are disclosed, by way of example, in an asset management system 100 as depicted in block diagram form in FIG. 1, and as further illustrated in FIGS. 2 through 17. A system of this type can be employed to rate the condition of a physical asset component, estimate the service life of the asset component and provide a basis to make decisions regarding the selection of repair alternatives and/or replacement options.

To rate the condition of the asset component, the asset management system 100 utilizes a process of inspection of the asset component to determine various types of problems or "defects" associated with the component. In addition, levels of severity, indicative of the "extremeness" of the problem, are also determined. Further, the inspection process determines the extent of the size of the problem, relative to the overall size of the asset component.

The foregoing data, in addition to other data generic to the asset component, is utilized with empirical information to determine serviceability fore-casts related to the asset component. Further, however, the asset management system 100, in accordance with the invention, allows the user to determine the relative "short-term" and "long-term" costs associated with selection of alternative actions directed to repair and replacement options. Accordingly, the system 100 in accordance with the invention allows the user to rapidly determine optimum repair and replacement alternatives, given budget constraints, expected required life or need of the asset component, and other similar factors.

Still further in accordance with the invention, the asset management system 100 can employ "actuarial" or historical data to provide data representative of repair costs, service life estimates and the like. The asset management system 100 is an adaptive or "feedback" system in that certain data representative of the asset component currently being rated and analyzed can subsequently be added to the actuarial data. In this manner, the forecasting or estimating accuracy of the system 100 for subsequent ratings and forecasts of additional similar asset components can be increased with respect to accuracy, based on the history of actual asset components.

As described herein, the asset management system 100 is specifically adapted for utilization to rate and evaluate asset components comprising a roof, or a series of roofs, of an industrial, commercial or similar organization. Roofs provide a good example of the types of asset components for which repair or replacement needs may have a significant financial impact on the organization. However, the condition of a roof and costs associated with repair and replacement requirements are typically not considered by an organization in estimating future expenses, cash flow and like financial information.

Notwithstanding the adaptation of the asset management system 100 to rating and evaluating serviceability estimates for roofs, it should be emphasized that an asset management system in accordance with the invention can be employed for numerous types of asset components. Further, although the asset management system 100 as described herein in accordance with the invention utilizes rating parameters related to the "appearance" of the roof asset, and the utilization of manual entry of data into the asset management system 100 representative of roof component defects, an asset management system in accordance with the invention does not require that the rating parameters representative of the condition of an asset component be obtained from viewing of physical appearance and/or manual entry of data representative of the appearance of the asset component. For example, rating parameters for an asset component comprising a mechanical, electrical or electromechanical device could be represented by instrumentation readings comprising parameters such as hardness of structural components, electrical resistance within circuit wiring, fuel efficiency, duty cycle accuracy and similar parameters. Such parameters could be entered into the asset management system by manual means or, alternatively, by instrumentation directly connected to the asset management system without any requisite manual intervention.

A general block diagram of the asset management system 100 is illustrated in FIG. 1. It should be emphasized that the specific elements of FIG. 1 are in part structural and in part functional or "procedural", in that they partially represent processes performed by the system 100. Referring specifically to FIG. 1, and in the illustrative embodiment described herein, the asset management system 100 is adapted for use in rating the condition of a roof 102 shown in symbolic format in FIG. 1. The rating and evaluation of the roof 102 is initiated by an operator 104 manually performing a "survey" of the roof 102. This survey is performed through the operator 104 making an actual visual inspection of the roof 102. This inspection is directed to discovering the general "state" of the roof 102, with respect to potential structural problems or defects. In addition, the operator 104 will also obtain general measurements of the roof 102, along with "generic" information regarding the roof 102. The actual procedures involved in the survey of the roof 102 by operator 104, along with the specific data which may be determined by the operator 104, will be described in greater detail in subsequent paragraphs herein.

As the operator 104 surveys the roof 102 and evaluates potential structural problems or defects, information regarding such problems or defects is entered by the operator 104 into an instrument 106. The instrument 106 may comprise a relatively conventional hand-held computer or similar device adapted for entry, storage and transmission of numeric and alphanumeric information. In addition, information regarding the general dimensions of the roof 102 can also be stored in the instrument 106 by operator 104. Still further, generic information regarding the roof 102 may also be entered into the instrument 106. Such generic information will be described in greater detail subsequently herein, but may comprise such information as the type of roof surface, roof age, and other relevant data.

After appropriate data regarding the condition and general generic information relating to the roof 102 has been stored in the hand-held instrument 106 by operator 104, the operator 104 can enter commands to the instrument 106 to cause the data to be transmitted to a central processing system 108 as symbolically depicted in FIG. 1. Such transmission can be attained through any of a number of conventional means. For example, a modulator/demodulator or "modem" 110 can be connected to the hand-held instrument 106. Alternatively, the modem 110 can actually be "built in" to the instrument 106. Data from the instrument 106 can be transmitted from the modem 110 over a transmission medium 112 to a receiving modem 114 associated with the central processing system 108. For example, the transmission medium 112 may comprise conventional telecommunications lines. However, any of a number of differing and well-known means can be employed for use as the transmission media 112.

The central processing system 108 as depicted in FIG. 1 is adapted to utilize the data received from the operator 104 via modem 110 and transmission medium 112, along with prestored data, so as to provide to a user information regarding the condition of roof 102 and estimates of its service life, given the present condition. In addition, in accordance with the invention and as described in subsequent detail herein, the central processing system 108 is further adapted to allow the user to selectively review and evaluate the impact and financial feasibility of alternative repair and replacement options relating to the problems or defects associated with the roof 102. It should be emphasized that the central processing system 108 as illustrated in FIG. 1 is a "symbolic" diagram, and represents in part structural elements and, in part, procedural functions.

Referring specifically to the structure and functions associated with the central processing system 108, the data representative of the condition of roof 102 as applied by the operator 104 to the central processing system 108 via the modem 110 and transmission medium 112 is received by a receiving modem 114. The receiving modem 114 applies the data in substantially "raw" form over a transmission line 116 as input signals to a text file 118. As described in greater detail subsequently herein, the text file 118 comprises data representative both of the problems or defects discovered with respect to roof 102, and various generic information regarding roof 102. The data is stored in text file 118 in a substantially sequential and "raw" format for purposes of user verification. More specifically, the data in text file 108 can be reviewed by the user or another operator for purposes of verifying data syntax and potential errors. For example, a user or a further operator can review and correct the data in text file 108 through a program identified as a correction procedure 119 under control of a user at the user entry terminal 121. The correction procedure is utilized to ensure that there are no inadvertent control characters which may have been inserted into the data stream during transmission over the transmission medium 112.

After the data in text file 118 has been reviewed and possibly corrected by the user or operator, the central processing system 108 is adapted to selectively apply the data as input signals into two separate files. More specifically, data representative of the problems or defects of the roof 102 is applied as input signals over the "symbolic" transmission line 120 to a "defects" file 122. As will be explained in greater detail in subsequent paragraphs herein, the defects file 122 comprises data regarding information identified by the operator 104 with respect to problems associated with the condition of roof 102. Correspondingly, the data from text file 118 representative of generic information associated with the roof 102 is applied as input signals on transmission line 124 to a generic file 126. Again, data stored in the generic file 126 is representative of generic information regarding the roof 102, such as the age of the roof, the geographic location, the existence or nonexistence of a performance contract relating to roof repairs, etc.

As further shown symbolically in FIG. 1, the data from the defects file 122 is applied as input data to a "deduct" processor 130. Correspondingly, actuarial or historical data is also applied as input data to the deduct processor 130 from a historical data file 134. The historical data file 134 comprises historical or actuarial information regarding the empirical "impact" of a particular type of problem on the overall "condition" of the roof 102, with respect to the estimated serviceable life of the roof 102. As will be explained in greater detail in subsequent paragraphs herein, each particular type of roof problem, along with the severity of the problem and the relative "size" of the problem, can be utilized from past historical experience to determine what could be characterized as a performance or serviceability estimate factor with respect to the impact of the problem on the anticipated useful life of the roof 102. With the data representative of the actual problems of the roof 102, from defects file 122 and the historical data from historical data file 134, the deduct processor 130 generates a "deduct value" for each of the individual problems identified with roof 102. Again, this concept will be explained in greater detail subsequently herein.

In addition to computation of individual deduct values for each of the problems associated with roof 102, the deduct processor 130 is also adapted to calculate an overall "total deduct value" associated with the entirety of the problems of roof 102.

Data representative of the deduct values and total deduct value is illustrated in FIG. 1 as symbolically applied as input data to a condition factor processor 138. In addition, historical or actuarial data is applied as input data from the historical data file 134 to the condition factor processor 138. The condition factor processor 138 is adapted to utilize the historical data fromfile 134 and the data from the deduct processor 130 to generate a roof condition factor which can be characterized as data representative of the overall condition of the roof 102. The historical data from the historical data file 134 can be characterized as providing the nonlinear function data regarding calculation of a roof condition factor, given the total deduct value of the roof 102 and other related data.

Data representative of the roof condition factor is applied as input data to a serviceability estimate processor 144. In addition, the serviceability estimate processor 144 utilizes input data applied over transmission line 146 from the generic file 126. Still further, additional data is utilized by the serviceability estimate processor 144 from the historical data file 134 as applied as input to the processor 144 via transmission line 146. The serviceability estimate processor 144 utilizes the data representative of the condition factor of roof 102, generic data representative of roof 102 and the historical data from historical data file 134 to generate data representative of a serviceability estimate for the roof 102. This serviceability estimate represents the anticipated useful life of the roof 102. The serviceability estimate can be generally characterized as a function of the condition factor previously calculated via the condition factor processor 138, the age of the roof 102 and other generic information associated with the roof 102. The historical data file 134 can be characterized as providing information representative of the nonlinearity of the function relating the serviceability estimate to these variables.

As further illustrated symbolically in FIG. 1, the serviceability estimate calculated by the serviceability estimate processor 144 can be applied as input data via transmission line 148 to an alternative asset management processor 150. Correspondingly, data representative of the roof condition factor as calculated by the roof condition factor processor 138 can further be applied as input data to the asset management processor 150 via transmission line 152. Still further, historical or actuarial data is applied as input data to the alternative asset management processor 150 via transmission line 154 from the historical data file 134. This information is utilized by the alternative management processor 150, along with "financial" data applied as input data over transmission line 156 from a financial data file 158. The financial data file 158 can be characterized as comprising data representative of costs associated with various types of roof repairs. Elements of such data are described in greater detail in subsequent paragraphs herein.

As further input to the alternative asset management processor, the user can enter various commands via transmission line 160 from a user entry terminal 162. These commands can be utilized to request the alternative asset management processor 150 to calculate the effect of selecting various repair and replacement alternatives on the serviceability estimate for the roof 102. In addition, and of primary importance in accordance with the invention, the alternative asset management processor 150 is adapted to generate output data representative of total and annualized costs associated with the selection of various repair and replacement alternatives. Such output data is shown in FIG. 1 as being symbolically applied via transmission line 164 to a user output terminal 166. In accordance with the invention, the user can then rapidly determine whether a particular repair or replacement alternative is financially feasible and worthwhile, relative to other alternative activities. Details associated with the operation and functions of the alternative management processor 150 are explained in subsequent paragraphs herein.

Prior to describing the specific concepts of the asset management system 100 in greater detail, a general understanding of the types of problems which may be encountered with respects to roofs is beneficial.

Accordingly, the following paragraphs briefly describe such problems or defects, along with concepts associated with an exemplary procedure for inspection of roof 102 by operator 104 and an exemplary procedure for "rating" the condition thereof.

Figure 2:
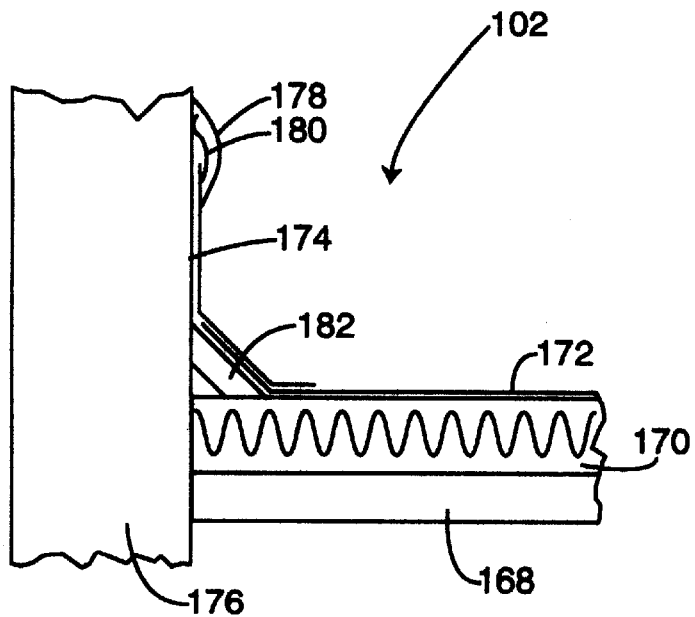
FIG. 2 is a sectional view of a roof section showing details associated with an exemplary construction of bituminous base flashing.

The structure of a section of a relatively conventional roof 102 is illustrated in part in FIG. 2. Referring specifically to FIG. 2, the conventional roof 102 comprises a lower deck portion 168 typically comprising a rigid structure and providing the lower base or support for the roof 102. On the upper surface of the deck portion 168, the roof 102 typically comprises an insulation layer 170 consisting of a number of various types of well known insulative materials. The insulation layer 170, in turn, is covered by a membrane 172 which provides the exterior surface of the roof 102.

An important aspect of any roof with respect to its condition is the base flashing. The base flashings typically provide a water tight "tie-in" of the roof membrane to adjacent building components, such as walls, curves, elevated roof edges and roof penetrations.

The particular configuration of the roof 102 as illustrated in FIG. 2 comprises a bituminous base flashing 174 which serves to provide a substantially water-tight tie-in of the roof membrane 172 to the adjacent building wall 176. Correspondingly, the upper portion of the bituminous base flashing 174 is typically covered with a metallic counter-flashing 178 as further illustrated in FIG. 2. The primary purpose of the counterflashing 178 is to provide additional "cover" for the upper edge of the base flashing 174 so as to further prevent any water or similar materials from seeping between the base flashing 174 and the adjacent building wall 176.

As also illustrated in FIG. 2, the roof arrangement 102 can further comprise a "strip-in" 180 positioned underneath the counterflashing 178 and on the upper surface of the bituminous base flashing 174. The strip-in 180 provides structural support for the base flashing 174 and counterflashing 178. In addition, the roof arrangement 102 can also comprise a cantilever strip 182 positioned in the corner formed by the adjacent building wall 176 and the membrane 172.

When a roof condition is being evaluated, it is not uncommon for the counterflashing 178 to be loose, "bent up" or, even possibly, completely missing. In such event, the upper edge or area of the bituminous base flashing 174 can be exposed. Typically, when a roof is being rated, this type of situation can be considered as a defect associated directly with the bituminous base flashing 174 itself, so long as the base flashing 174 is substantially functioning, and it does not appear that water can actually enter the building between the base flashing 174 and the adjacent building wall 176. Otherwise, rather than attempting to rate the defectiveness of the counterflashing 178 with respect to the overall condition of the roof 102, it is best to ignore the condition of the counterflashing 178 with respect to a condition rating of the overall roof 102. Correspondingly, in such an event, the counterflashing 178 should be repaired as soon as possible.

In determining defects associated with base flashings, and with respect to other structural elements of the roof 102, it is preferable to determine not only the existence of a defect, but also the "severity" level of a defect. For example, defects associated with bituminous base flashings may be rated as either of a "medium" severity level, or, alternatively, of a "high" severity level. As a specific example of a bituminous base flashing defect having a medium severity level, the base flashing may be deteriorated, but with no actual "holes" present in the flashing. As a further example, bituminous base flashing comprises mineral-surfaced cap sheets. A medium severity level defect may be a situation where the mineral-surfaced cap sheets have lost a substantial portion of the mineral surfing itself. In such an event, the organic felts located below the mineral-surfaced cap sheets will often be exposed and have a relatively "dark" and "fuzzy" appearance. As a further example, when the bituminous base flashing comprises smooth asbestos felts, coatings are typically applied to the felts. Such coatings can be composed of flashing cement or, alternatively, brushed-on layers of plain black or aluminum-pigmented cut-back asphalt. A medium severity level defect in the base flashing may be shown by the smooth asbestos felts having lost a substantial portion of their coatings. When asbestos felts are exposed, then typically have a "gray" appearance.

As another example of a medium severity level defect, the bituminous base flashing may have a height above the upper surface of the insulation layer 170 which is of an insufficient height for purposes of providing a water-tight tie-in of the membrane 172 to the adjacent building wall 176. For example, a base flashing height of less than six inches could be characterized as a medium severity level defect.

As previously described, bituminous base flashing defects may also comprise a high severity level. As an example, holes perforating the base flashing 174, resulting from deterioration or mechanical damage, can be characterized as a defect of a high severity level. Also, if laps or vertical seams in the flashing piles are open, in a manner such that they would allow water to seep behind the base flashing 174, this situation can also be considered a defect of a high severity level. Still further, a situation where there is an exposed gap at the top of the bituminous base flashing 174, such that the flashing is no longer attached to the wall 176 and water can actually seep behind the flashing 174, should also be characterized as a defect of high severity level. This condition of exposed flashing gaps can result from a situation such as the absence of counterflashing, an absence of nails holding the flashing 174 to the wall 176, and many other types of defects.

When a defect is found with respect to the roof 102, the "degree" of the defect can be characterized in part by the severity level as previously described. However, it is preferable to include, in the condition rating, other parameters which facilitate quantifying the condition of roof 102. As an example, a defect can be further defined in terms of the "size" of the defect relative to the overall size of the structure or element of the roof 102 then being considered.

As a more specific example with respect to the bituminous base flashing defects as previously described herein, the operator 104 rating the condition of roof 102 can count and measure, for example, the length of the bituminous base flashing 174 having the previously described defects. With respect to such measurements, if holes are discovered in the bituminous base flashing 174 which are of a length of less than one foot, or laps and seams are found which are relatively "open", such defects can be characterized as each having a measurement of one foot. Correspondingly, if the distance between two adjacent defects is less than one foot, the two defects can be collectively characterized as having a problem measurement of one foot.

With this type of measurement criteria, a parameter can be introduced into the roof condition rating which can be characterized as a "problem density." This concept of a problem density can generally be characterized as a parameter quantifying the size of the problem defect relative to an overall size of the roof then being evaluated. As a further example, the problem density can be characterized as being calculated in the following manner:

Problem Density=A/(B+C/100)×100     (Equation 1)

where A is equal to the length of bituminous base flashing defects (in feet or similar measurements), B is the total length of bituminous base flashings then being rated, and C is the total area of the portion of the roof 102 then being rated (in square feet or similar measurements). In accordance with the foregoing, a "density" can be obtained as a parameter relating to the condition of the roof 102. Further, in accordance with all of the. foregoing description of the exemplary rating of the roof 102 with respect to bituminous base flashing defects, the operator 104 can generate rating condition information comprising a problem type, severity level associated with the problem and a density parameter relating the size of the problem with respect to the overall size of the area being rated.

With respect to bituminous base flashings having an insufficient height, such an insufficient height can be characterized as a problem condition, since such a condition can allow wind-driven water to enter the building of the roof over the top of the base flashing. Also, if the roof is being maintained in a relatively cold climate, drifted snow or the like can saturate with water above a minimal height, and similarly allow water to seep into the building between the base flashing and the adjacent wall. Correspondingly, flashing splits or tears can result from mechanical damage, material shrinkage, unattached membrane pulling on the flashing, or differential movement between the wall 176 and the deck 168.

As a further example of potential problems associated with the roof 102, and which can. be utilized as input to the overall determination of the roof condition, various other types of problems can occur with respect to the bituminous base flashing 174. For example, "delamination" or "sliding" can occur with respect to the base flashing 174. As an example of such a problem having a medium severity level, the bituminous base flashing 174 may be water-tight. However, delamination can occur between the flashing 174 and the substrate, or between plies in the flashing 174. Further, "sliding" can occur between the flashing and the substrate, or between plies in the flashing, notwithstanding that the flashing 174 is maintained water-tight.

On the other hand, delamination or sliding can be characterized as a problem of relatively high severity level when the top part of the base flashing 174 has "sagged" down, or where the entirety of the flashing 174 has sagged. As another example, it is possible for the top portion of the flashing 174 (i.e. the portion of the flashing 174 above the cant strip 182) to have fallen away from the adjacent building wall 176. Such delamination and sliding can result from relatively weak attachment between the flashing plies, or between the flashing and the substrate.

As a further example of the causes which may be associated with such a problem, the flashing plies may not have been firmly pressed into the bitumen of the flashing 174 when first installed, in a manner so as to form a solid and continuous laminate. Also, it is possible that no primer was utilized on the adjacent building wall 176 at the time of installation.

Similarly, it is also possible that the "wrong" bitumen was utilized to attach the flashing plies to the wall. Still further, it is possible that the flashing cement was improper or of relatively poor quality, too few nails were utilized to maintain the flashing 174 against the building wall 176, or the bitumen as applied in a "hot" state was allowed to cool before the flashing plies were applied. Still further, it is possible that the membrane 172 or the insulation layer 170 was not properly attached, resulting in membrane contraction "pulling" on the base flashing 174. In addition, it is also possible that the adjacent building wall 176 may have "moved" at a different rate then the any corresponding movement of the lower deck portion 168, thereby causing the flashing 174 to be delaminated or torn.

Figure 3:
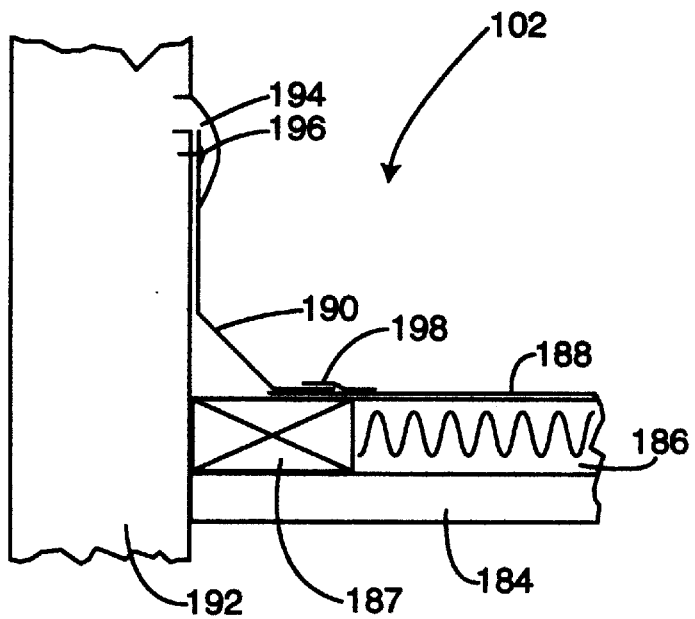
FIG. 3 is a sectional view of a roof section showing an exemplary construction of metal base flashing.

In addition to problems associated-with the bituminous base flashing 174, problems can occur with respect to other types of flashing. For example, a number of conventional roofs employ metal flashings to provide a water-tight attachment of the roof membrane to adjacent building components. FIG. 3 illustrates an exemplary metal flashing construction. Referring specifically to FIG. 3, the roof 102 is again supported on a lower deck portion 184. Positioned above the lower deck portion 184 is an insulation layer 186. A nailer 187 is positioned adjacent the insulation layer 186.

As with the bituminous base flashing described with respect to FIG. 2, the metal flashing arrangement also includes a membrane 188 located above the insulation layer 186. A metal flashing 190 is attached to the upper surface of the membrane 188 and to the side of an adjacent building wall 192 for purposes of providing a water-tight tie-in of the membrane 188 to the wall 192.

As with the bituminous base flashing arrangement, a counterflashing 194 is positioned along the upper edge of the metal flashing 190 against the adjacent building wall 192. Nails or fasteners 196 are employed to attach the counterflashing 194 and the metal flashing 190 to the adjacent building wall 192. Correspondingly, a strip-in 198 can be located along the outer lower edge of the metal flashing 190 above the roof membrane 188.

Figure 4:
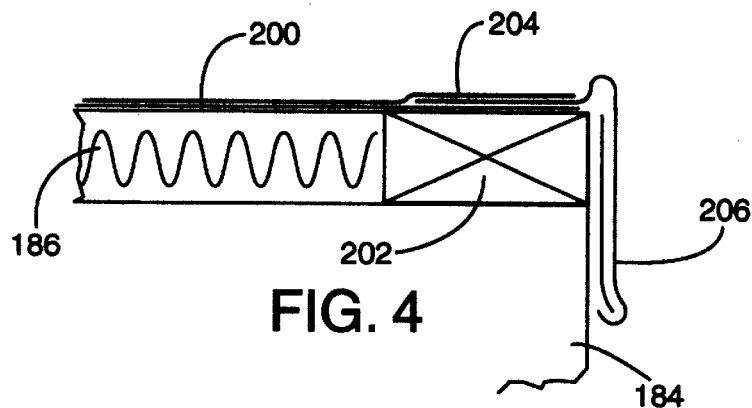
FIG. 4 is a sectional view of a roof section showing details of a flush-mounted gravel stop and facia edge.

Typically, defects associated with metal flashings normally occur when such flashings are tied into the roof membrane. The tie-in occurs at a metal flange which forms an integral part of the metal flashing 190 as illustrated in FIG. 3. This flange is set over the roof membrane and covered with the strip-in 198. Such a tie-in procedure is commonly utilized with gravel stop and fascia edges. Such a tie-in arrangement with this type of an edge is illustrated in FIG. 4. As illustrated in FIG. 4, showing the detail of a flush-mounted gravel stop and fascia edge arrangement, the arrangement includes an insulation layer 186 mounted above the lower deck portion 184. Roofing plies 200 are positioned above the insulation layer 186. A nailer 202 is positioned as shown in FIG. 4 adjacent the insulation layer 186. A strip-in 204 is located above the nailer 202. A continuous cleat 206 is formed around the edge as further illustrated in FIG. 4.

Figure 5:
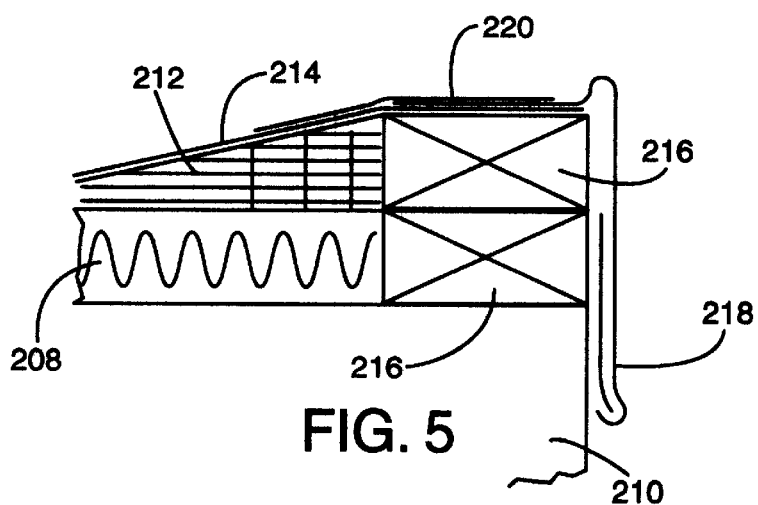
FIG. 5 is a sectional view of a roof section showing details of a raised gravel stop and facia edge.

This procedure of employing a flange set over the roof membrane and covered with a strip-in is also employed with a raised gravel stop and fascia edge arrangement as illustrated in FIG. 5. As shown in FIG. 5, an insulation layer 208 is positioned above a lower deck portion 210. A tapered edge strip 212 is located above the insulation layer 208. Roofing plies 214 are located along the upper surface of the tapered edge strip 212. Wood nailers 216 are positioned adjacent the insulation layer 208 and tapered edge strip 212. A continuous cleat 218 is positioned around the edge as specifically illustrated in FIG. 5. A strip-in 220 covers the portion of the cleat 218 which is set over the roofing plies 214.

Figure 6:
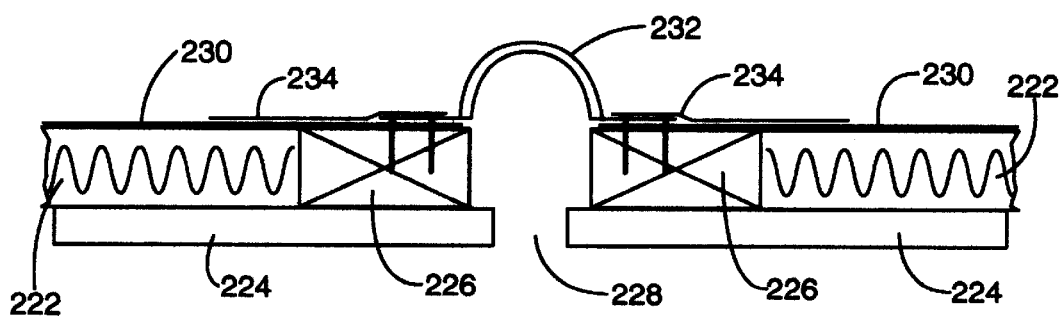
FIG. 6 is a sectional view of a roof section showing details of an exemplary flush-mounted expansion joint cover.

The tie-in arrangement employing metal flashing can also be utilized with a flush-mounted expansion joint arrangement as illustrated in cross section in FIG. 6. Referring specifically thereto, insulation layers 222 are positioned above lower deck portions 224. Wood blockings or nailers 226 are located adjacent the insulation layers 222 and further adjacent an expansion joint 228. Membranes 230 cover the insulation layers 222 and wood blockings 226. An expansion joint cover 232 having a cross section as illustrated in FIG. 6 is positioned above the expansion joint 228 and nailed or otherwise appropriately attached to the wood blockings 226. Strip-ins 234 are utilized to cover the edges of the expansion joint cover 232.

Figure 7:
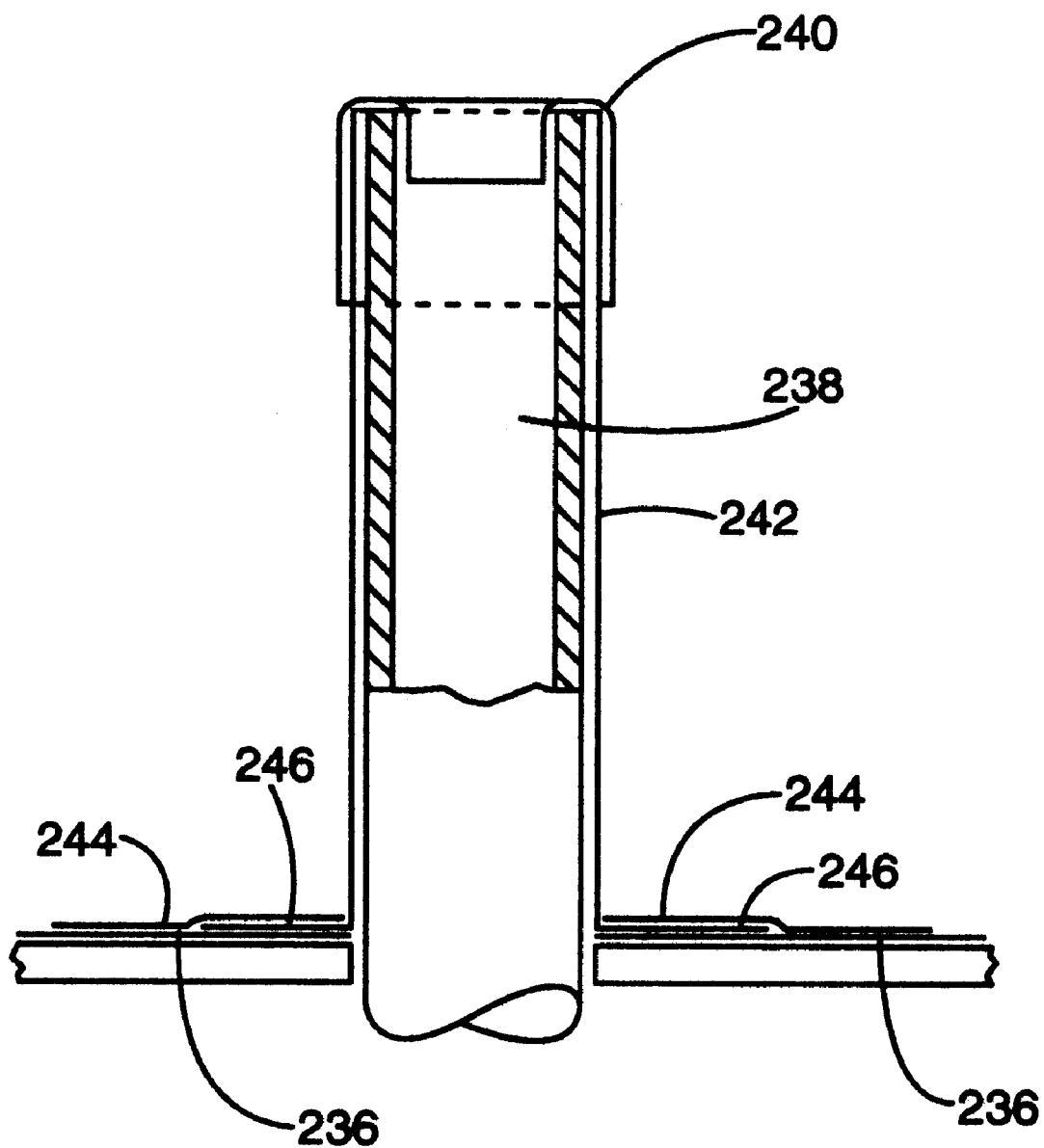
FIG. 7 is a sectional view of a roof section showing details of an exemplary vent pipe flashing.

This procedure of employing metal flashings can also be utilized to provide a water-tight tie-in of a roof membrane to adjacent building components such as roof penetrations for ventilation pipes and the like. For example, as illustrated in FIG. 7, a roof having a surface membrane 236 can be penetrated by a ventilation pipe 238. The ventilation pipe 238 utilizes a conventional cover 240 at its upper terminating end above the surface membrane 236. A flanged sleeve 242 having a cylindrical configuration can be engaged and covered by the cover 240 at its upper end, and further covered by strip-ins 244 along its lower horizontal flange 246 as further illustrated in FIG. 7.

Although most metal flashing defects appear to occur where such flashings are tied into the roof membrane, it should be mentioned that various types of metal flashings are not tied into a roof membrane whatsoever. Examples of such flashings include counterflashings, curb-mounted expansion joint covers, metal copings and a number of curbed opening and equipment covers.

With respect to the types of problems which may occur, an example of a medium severity level problem is one where a metal base flashing (including the portion of the metal base flashing located under the counter flashing) is less than a sufficient height. Correspondingly, examples of high severity level problems associated with metal flashings include the existence of splits within the strip-ins. Such splits can often occur at the joints between sections of the metal and along the length of the flange edge. Examples of other high severity level problems include situations where holes exist through the metal, resulting from corrosion or mechanical damage.

As with defects associated with bituminous base flashings, it is preferable to include not only data representative of the type of problem and severity level associated with the metal flashing defect, but also to include a parameter representative of the problem density of the defect. Such problem density measurements can be determined in a manner substantially similar to the density measurements described with respect to bituminous base flashing defects.

An example of another type of problem associated with a roof condition relates to the existence of repairs to bituminous base flashings and roof membranes. Although repairs, in and of themselves, do not necessarily represent defects or problems which should be considered with respect to the condition of the roof, some types of repairs may be relatively well known to be somewhat ineffective in attempting to overcome original types of roof defects. When such an ineffective repair condition is encountered, it may be preferable to attempt to ascertain the original problem for which the ineffective repair was effected, so as to more accurately rate the roof condition.

A further type of problem which can exist with respect to a conventional roof comprises the existence of splits in the roof membrane. Such splits are commonly tears which extend through the membrane. Such tears often result from the membrane being pulled apart by tension stresses which exceed the membrane strength. The membrane splits can often vary in length from only a few feet to the entirety of the length of the roof. Correspondingly, such splits can vary in width from a hairline split, to a split which may be greater than one inch or more.

With respect to severity levels associated with membrane splits, a defect which can be characterized as being of a medium severity level may be one where a membrane split has resulted from structural movement which can be resolved with the installation of an expansion joint. Such a split can often occur at a tie-in between a building addition and an existing construction, or also occur at "change" point in the type or direction of a deck portion of the roof. In addition, such splits can also occur at relatively abrupt changes in roof elevations, such as at a junction of differing roof insulation thicknesses.

With respect to membrane splits which can be characterized as defects having a high severity level, such splits may comprise ones which have occurred without any apparent relationship to the conditions associated with a medium severity level-split. In such an instance, such splits can likely be attributed only to problems associated with the structural roof system itself. As an example, it is not uncommon to discover splits which occur directly above joints between sides of insulation boards. Such splits may result from the membrane being too weak, without any other underlying causes. Further, such splits may result from a lack of attachment between the roof membrane, insulation and the deck portion.

With respect to determining a problem density associated with a membrane split defect, computations other than the computation described in Equation 1 may be preferable. For example, when a medium severity level split has occurred at the boundary between two roof areas, it may be preferable to "count" the condition with respect to both roof areas. Further, the width of insulation boards employed with the roof construction may be of importance, particularly with respect to high severity level membrane split defects. As an example, the calculation of a problem density with respect to a high severity membrane defect may be computed as follows:

$$\text{Problem Denisty} = (A \times C)/B \times 100 \qquad \text{(Equation 2)}$$

where A represents the total length of the membrane splits, B represents the total area being rated, and C represents the width of the insulation board.

As an example of another type of problem defect which may occur with respect to roof membranes, it is relatively common to discover membrane "ridges." Ridging can result, for example, from expansion and contraction of insulation boards and membranes caused by cycles of heat and cold, and/or cycles of wetting and drying. Such ridges are typically long, narrow and raised portions of the roof membrane. Such ridges often occur directly above the joints of insulation boards.

With respect to severity levels associated with membrane ridges, a ridge which is substantially barely. noticeable may be characterized as having a relatively low severity level. Such ridges may still have most of the aggregate and bitumen covering the ridges, and it is not possible to see any felt below the membrane. As an example of a medium severity level problem, such ridges may be relatively obvious in appearance. Further, the aggregate may have fallen off of the membrane, and the bitumen actually has run off of the membrane. Still further, the top felt may be exposed to view.

As examples of high severity level membrane ridges, open cracks may have developed in the membrane. Also, regardless of whether or not cracks have occurred, felt deterioration may have progressed through the top ply, thereby exposing underlying plies.

A further problem associated with roof membranes may be the existence of holes within the membrane. This type of problem may be one where it is substantially unfeasible to define or otherwise describe a severity level associated with the holes. In general, if any type of membrane penetration may be suspected of leakage, such a penetration should be characterized as a membrane hole defect.

However, notwithstanding that it may not be preferable to define a severity level associated with such membrane holes, it may still be preferable to define a problem density associated with this particular type of defect. For example, the problem density parameter may be defined as a function of the number of membrane holes, relative to the total area of the roof currently being rated.

Another type of problem which can occur with respect to roof membranes can be characterized as membrane "blisters." Primarily, membrane blisters comprise areas of the roof membrane which are raised up or higher than when the roof membrane was originally installed. Such blisters typically have a bubble-like appearance and, when "pressed on" when warm, have a relatively soft and spongy feel. Blisters will often form between felt layers, although blisters will also sometimes form between the membrane and the substrate to which the membrane is attached.

With respect to severity levels of membrane blister defects, a relatively low severity level defect can be characterized as existing when the raised areas are barely noticeable to the human eye. In such situations, most of the bitumen and aggregate is still in place, and the membrane felts are not exposed. Correspondingly, a medium severity level membrane blister defect can be characterized as existing when the raised areas of the membrane are relatively distinct and obvious. In such situations, the aggregate has typically fallen off and the bitumen has run off. Correspondingly,. the felts of the membrane are then typically exposed and are often in a deteriorating state. In general, a membrane blister can be characterized as being of a medium severity level whenever the membrane felts are exposed. The membrane blister may occur at a lap location, and pulling on the lap has resulted in an area having no aggregate surfacing. At such pulled laps, bitumen may still be covering the area, but without the aggregate.

A high severity membrane blister defect can be characterized as one where the membrane felts have deteriorated to the point that the blister is actually open and allows water into the roofing or the building. In general, any membrane blister which is broken open in a manner so that water enters the roofing or the building should likely be characterized as being of a high severity level.

Membrane blisters are often caused by a combination of voids (i.e. skips or bubbles) in the bitumen within the membrane, along with water vapor. When heated by the sun, the water and air gasses may expand, thereby enlarging the blister. When the membrane cools (as at night), the membrane blister may become rigid and some-what shrink. Accordingly, gas pressures within the blister may then drop, allowing more water vapor to seep through the porous and absorbent membrane. In addition, water can be drawn into the blister from wetted membrane felts. When the membrane is then exposed to the sun, this "cycle" again begins. In this manner, the blister can be enlarged.

With respect to the determination of a "size" quantifying parameter, a problem density can be characterized for the blisters. Preferably, this problem density can be characterized as a determination of the size of the general total area of the membrane blisters, relative to the size of the total area of the roof then being rated.

As a still further example of problem defects associated with roof membranes, the concept of "exposed felts" can be characterized as a defect. Such exposed felts can be caused by overall weathering and aging of the membrane bitumen and felts. Further, various situations can accelerate this weathering and aging condition. For example, felt exposure can be accelerated by inadequate interply coatings of bitumen. Also, an insufficient embedment of the aggregate can also cause accelerated aging. Still further, wind erosion which may occur at roof corners, and water erosion such as may occur when downspouts empty directly onto the membrane, may also cause accelerated felt exposure. Still further, it is relatively well known that bitumen is appropriate for use on a membrane only up to a certain maximum roof slope. If bitumen is utilized on a slope which is greater than the appropriate maximum slope, the bitumen can run off, thereby leaving the felts exposed. Such exposure can occur with respect to localized areas of the roof, or the entirety of the roof.

Exposed felts can be characterized as lacking a top surfacing of the bitumen and, typically, loss of aggregate surfacing. As the bitumen on the membrane thins, the felts become exposed to the weather and may deteriorate. Also included within the general area of exposed felt defects are exposed metal flange strip-in felts, upturned felt edges and "fishmouths." Fishmouths can be characterized as relatively short sections of the edges of a felt that are raised up above the rest of the felt.

With respect to severity levels associated with problems related to exposed felts of roof membranes, it is possible to categorize the severity levels in terms of low, medium and high levels. For example, a low severity level defect may be one in which the membrane felts remain covered with bitumen, but the aggregate is not embedded within the felt, or is otherwise poorly embedded. Correspondingly, a felt exposure defect of medium severity level may be one in which the top pour of bitumen is worn through, and the top felt is exposed to view and may have a relatively "fuzzy" appearance. Other problems which may be characterized as being of medium severity levels include the exposure of an upturned felt edges and, on mineral-surfaced roofs, the situation were the mineral granules have come off, thereby exposing the underlying felt.

Similarly, a felt exposure defect of high severity level may be one where felt deterioration has progressed through at least one of the plies, thereby exposing underlying bitumen or plies, and possibly allowing water to enter the roofing or the building. In fact, it is possible that deterioration can proceed to the point that sections of the roof membrane are completely missing, revealing actual insulation or decking. Correspondingly, on mineral-surfaced roofs, the roof membrane may be broken through the felt plies, typically in a direction along the axis of, or perpendicular to the axis of the felt direction.

In determining a problem density for a felt exposure defect, the general area of the roof having the felt exposures can be measured. When the felt exposures are of a relatively large quantity, it may be possible to estimate the roof area comprising the defect by conventional estimation means, such as representative sampling techniques. Regardless of the manner in which the roof area comprising the felt exposures is determined, the density of the problem defect can be characterized as a ratio of the area of roof membrane exposed felts to the total area of the roof then being rated.

A further type of problem which may be associated with roof membranes can be characterized as the phenomenon of membrane "alligatoring." Membrane alligatoring can be characterized as a surface condition in which the top coating of bitumen is cracked. This cracking can have an appearance somewhat similar to- the hide of an alligator. Roof membrane alligatoring is relatively common on smooth-surfaced roofs, although such alligatoring phenomenon can occur on aggregate-surfaced roofs. Typically, alligatoring is somewhat related to the density of the top pour of bitumen of the roof membrane. That is, the heavier the top pour of the bitumen, the worse the alligatoring tends to appear.

With respect to severity levels of roof membrane alligatoring, it may be possible to determine some type of quantifying degree of bitumen cracking. However, this is relatively difficult and it may be preferable to ignore any severity level determination. That is, it may be sufficient to indicate that a problem defect has occurred merely by the fact of the existence of roof membrane alligatoring. With respect to a problem density measurement, the area of the roof comprising the alligatoring effect can be measured. A problem density can then be defined as the area of the roof membrane alligatoring relative to the total area of the roof-then being rated.

Roof membrane alligatoring can result from aging bitumen, combined with weathering and temperature cycling. In such situations, the bitumen will gradually lose the ability to "flow back" together, and alligatoring is thereby enhanced.

As earlier described, the particular problems associated with the condition of a roof 102 as described herein, are merely exemplary. That is, other types of problems can be defined for inspection and rating of roofs, without departing from any of the novel concepts of the invention. Still further, as also earlier described, the principles of the invention are not limited to an asset management system directed to the rating of roofs per se. Accordingly, an asset management system in accordance with the invention can be employed with respect to the rating of numerous types of assets, wherein such assets may be defined in some manner by quantifying parameters with respect to the "condition" of the asset.

Figure 10:
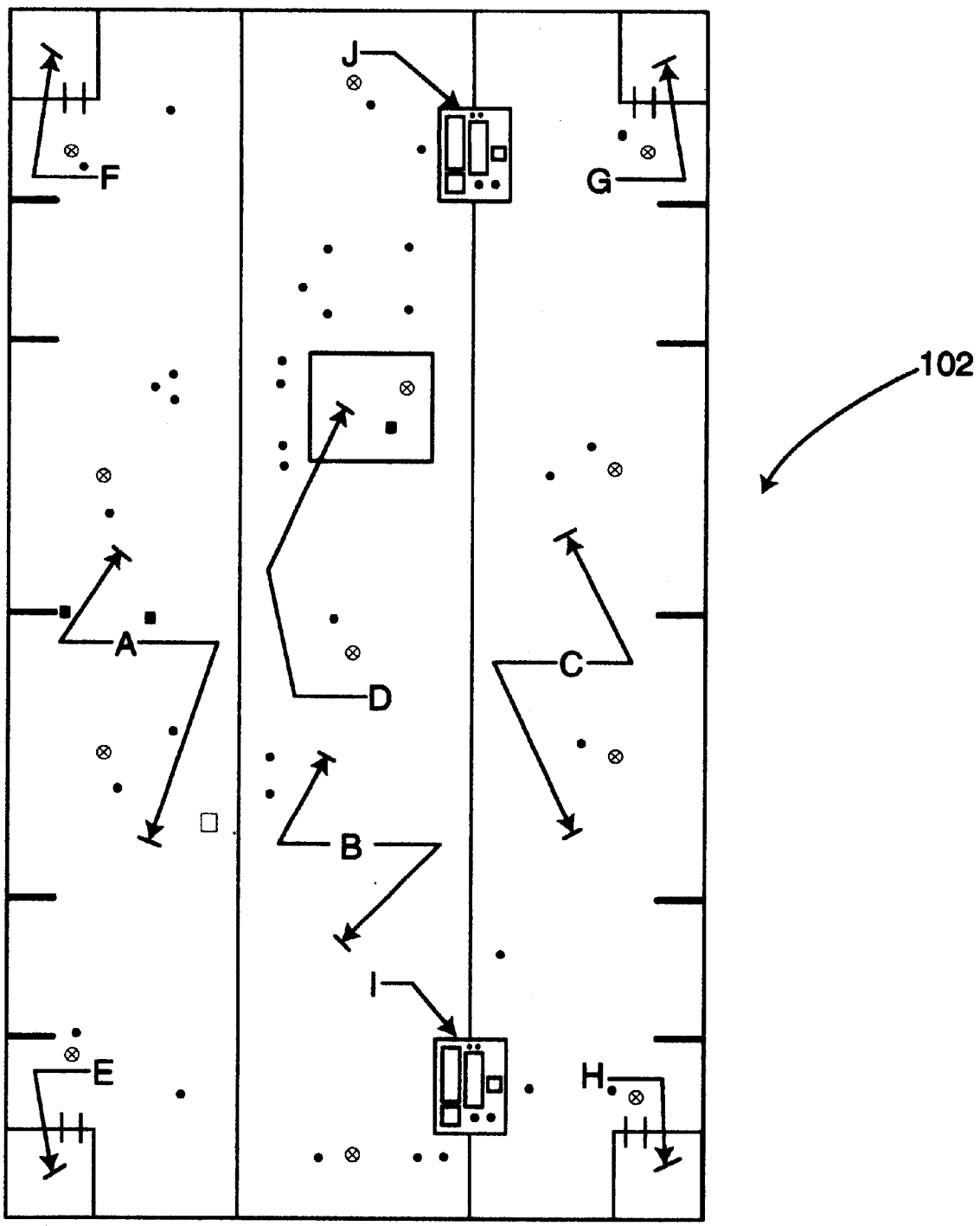
FIG. 10 is an exemplary illustration of a diagram of a roof.

Returning to the exemplary embodiment of the rating of roof 102, as the operator 104 determines the particular problems associated with the roof 102, it may be worthwhile to generate a diagram of the overall plan of the roof 102. As an example, for purposes of accuracy with respect to the rating of the roof condition, it may be preferable to divide the roof into various individual areas. That is, a particular roof area may have a certain type of surface, insulation and other parameters, whereas a differing area of the roof may utilize a different surface and insulation type. Also, one portion of a roof may have a substantial slope, while another portion of a roof may actually be flat. For these reasons, the operator 104 may wish to actually divide the roof into various areas, such as the areas depicted in FIG. 10. For purposes of rating the condition of the roof 102, it is possible for each of the areas to be characterized as a different roof segment. As illustrated in FIG. 10, the plan of the roof 102 could be divided into various individual areas, identified as areas "A" through "J."

Figure 8:
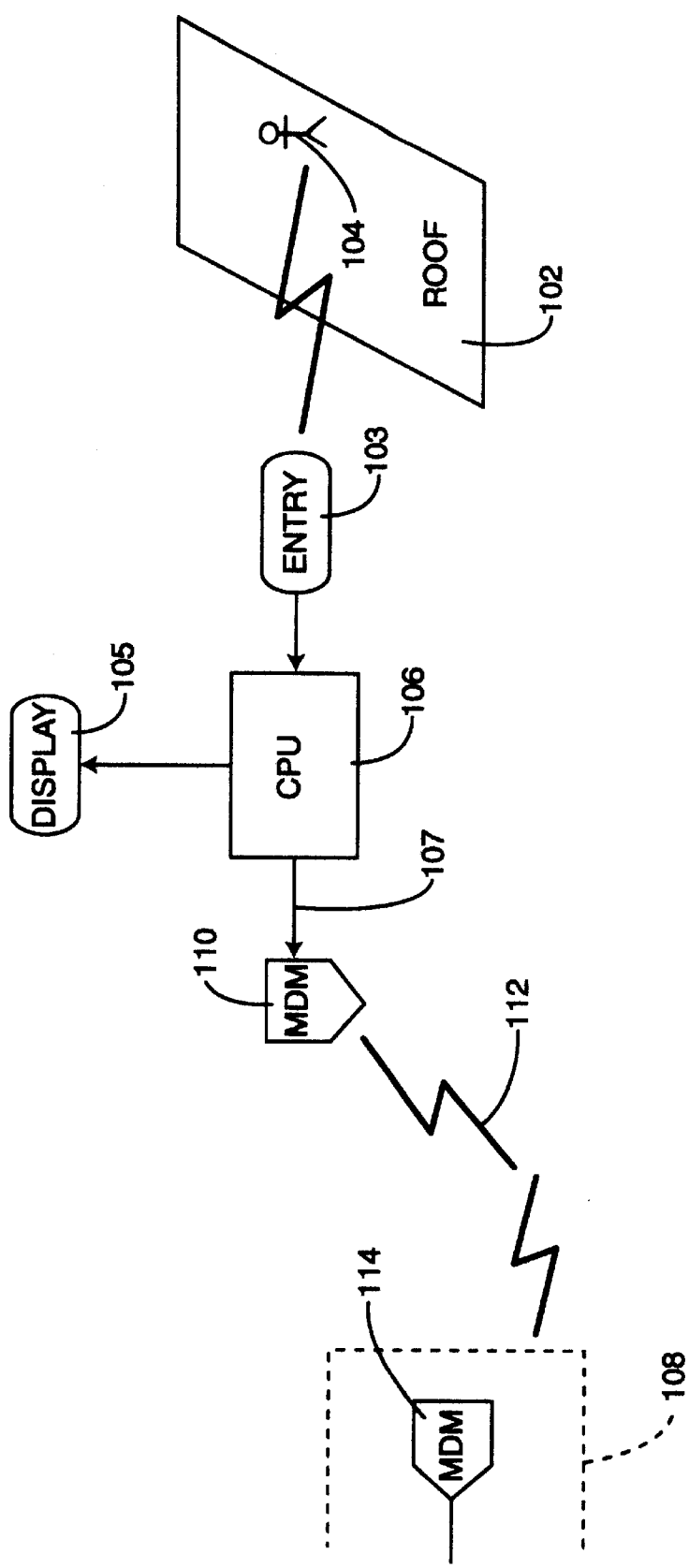
FIG. 8 is a symbolic illustration of a roof and the entry of data into the asset management control system in accordance with the invention.

With respect to each of the areas of the roof 102, and with reference to FIG. 8, the operator 104 can inspect the roof 102 for problems such as the problem defects previously described herein. With respect to each of the particular problems, the operator 104 can manually input data into the hand held instrument or central processing unit (CPU) 106 representative of the particular type of problem encountered with the roof 102. That is, when a particular set of potential problems have been defined for the roof 102, each problem defect can be identified by separate number. For example, a problem type "10" can be characterized as the problem associated with membrane alligatoring. Data entry can be made through entry keyboard 103, with data and ineractive commands displayed on display screen 105.

In addition to the entry of data into the CPU 106 representative of problem types, the operator 104 can also manually input data into the CPU 106 representative of severity levels. As earlier described, it may be preferable to divide the particular types of problem defects encountered in the roof 102 into severity levels identified as low, medium and high severity levels. Further, however, as also earlier described, particular types of problems may have only two defined severity levels, or, with respect to certain types of problems such as membrane alligatoring, it may be preferable to not include any type of defined severity level.

After the operator has entered data into the CPU 106 representative of a severity level of a particular type of problem, further data can be entered into the CPU 106 as required for purposes of calculating a problem density. As earlier described, the computations of problem density may differ depending on the particular types of problems defect encountered. However, such information as to the requisite data to be entered into the CPU 106 for computation of a particular problem density for a specific type of problem defect can be preprogrammed in the CPU 106 or, alternatively, in the central processing system 108 as illustrated in FIG. 1.

When all of the requisite data has been entered into the CPU 106 by the operator 104, additional commands can be provided by operator 104 to the CPU 106 to appropriate transmit the data stored in CPU 106 over a transmission line 107 to modem 110. Correspondingly, the modem 110 can be adapted to further transmit signals representative of the data entered into and stored within CPU 106 to the modem 114 comprising a portion of the asset management processing system 108 illustrated in FIG. 1. As earlier described with respect to FIG. 1, transmission line 112 can be in the form of conventional telephone lines or similar communications media. Further, the modem 110 can actually comprise an integral portion of the central processing unit 106, with the transmission line 107 and the modem 110 actually being contained within a single physical compartment of the central processing unit 106.

Various types of hand-held or otherwise relatively small computers can be utilized for the central processing unit 106. Further, a number of different devices can also be employed for modem 110. For example, the central processing unit 106 can comprise a Radio Shack 80-Model 102 computer. Further, the modem 110 can comprise an RS 232 interface modem actually built in to the model 102 computer.

Figure 9:
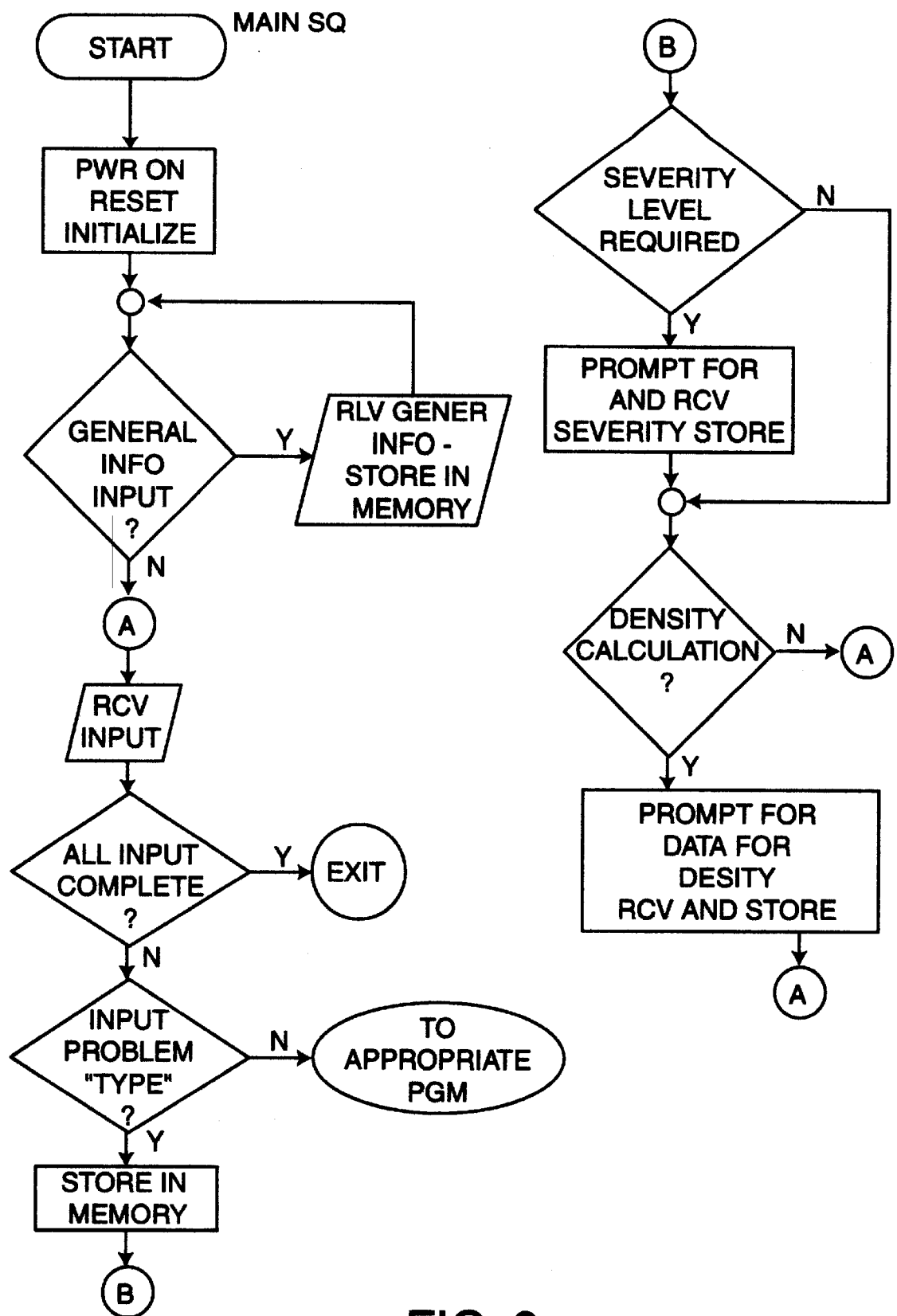
FIG. 9 is an exemplary sequence diagram showing entry of data into the asset management control system in accordance with the invention.

A general block diagram of exemplary operational sequences of the central processing unit 106 are illustrated in the flowchart diagram depicted in FIG. 9. Referring specifically to FIG. 9, a diagram is shown for a real-time overall operating sequence which can be utilized in the central processing unit 106. As shown in FIG. 9, the overall operating sequence can be initiated at a main entry point MAINSQ, and comprises a functional sequence for reception of various data from the operator 104.

Functional entry to MAINSQ in the instruction sequence of the central processing unit 106 can be performed in response to activation of power by the operator 104 or a similar initiation action. General initiation functions can be first performed, such as clearance of general purpose computer registers, memory storage, etc.

After initiation of the operating sequence of central processing unit 106, the operator 104 can enter data (through-use of a keyboard or similar entry device) representative of "generic" information associated with the roof 102. For example, such information can comprise the year in which the roof 102 was constructed, the roof area (or area of the particular portion of the roof being inspected and rated), surface type, membrane type, insulation type, etc. The central processing unit 106 can be utilized to "prompt" for such information (through a digital display device or similar visual display), with the operator 104 entering the generic information through the manual input device. As the generic information is entered-through the input device of central processing unit 106, it can be stored in appropriate memory locations within the unit 106.

Following input of all appropriate generic information, the central processing unit 106 can be adapted to prompt the operator 104 for additional input. Through either a predetermined and preprogrammed sequence in which the operator 104 is to enter data, or through the use of data codes or similar functions, the particular type of data-then currently-being entered-into the central processing unit 106 can be determined. For example, when all generic information has been input into the central processing unit 106, the digital display device 105 can be utilized to "prompt" the operator 104 for a problem "type" to which subsequently entered data will be directed. As earlier explained herein, each of the particular problem defects can be represented as a particular type of defect by means of a numerical indication or the like. As an example, a problem associated with membrane alligatoring can be characterized as problem type 10.

After the prompt for the problem type, the operator 104 can enter data through the manual entry device 103, with the input data representative of a particular problem type. In a conventional and well known manner, the data entry can be received from the manual entry device 103 into the central processing unit 106 by means of the operator 104 entering a "transmit" instruction through the use of a single key on the manual entry device 103 or by similar means. After the data representative of problem type has been entered into the manual entry device 103, and the operator 104 has indicated transmission of the data as appropriate, the data can be received by central processing unit 106 and stored in an appropriate memory location within the unit 106.

Thereafter, the central processing unit 106 can be prompted for additional data representative of the particular severity level for the specific problem defect. Also, as earlier described, certain types of problem defects may not be conducive to the use of a severity level. In such instances, the operator 104 can enter appropriate commands indicating that no severity level is to be associated with this particular problem type. Alternatively, the central processing unit 106 can be preprogrammed in a relatively well known manner so that the operator 104 is prompted for a severity level indication only if such a severity level is to be associated with this particular type of problem.

Assuming that a severity level is associated with this particular type of problem defect, the operator 104can then enter data through the manual entry device 103 and into the central processing unit 106 indicative of the particular severity level. Thereafter, the central processing unit 106 can store the information representative of the particular severity level in an appropriate memory location.

Following the designation of the severity level to be associated with a particular problem type, the operator 104 can then be prompted by the central processing unit 106 through display device 105 for data representative of the particular problem density associated with the problem defect. As earlier described, the computation of a problem density will be dependent on variables which may differ depending on the particular type of problem defect. The central processing unit 106 can be preprogrammed so as to transmit to the display device 105 "prompt" commands for the appropriate data for purposes of calculating a problem density for this particular type of problem defect. Alternatively, given knowledge of the particular type of calculation to be used for determining a problem density for this particular type of defect, the operator 104 can enter data directly through the entry device 103 with command codes indicative of the particular variables which the entered data represents. The particular method for allowing the operator 104 to enter data representative of problem density can be varied as desired, and does not form any basis for the principal concepts of an asset management system in accordance with the invention.

When the appropriate data has been entered by the operator 104 for purposes of allowing a computation of problem density, this data can then be stored in appropriate memory locations in the central processing unit 106. Following storage of the appropriate data associated with the problem density computations, the central processing unit 106 can then prompt the operator 104, through the display device 105, for information regarding an additional problem defect. The foregoing sequence of operations can then be repeated for each problem defect discovered by the operator 104.

When all problem defects and associated data relating to the severity level and problem density have been entered into the central processing unit 106, the operator 104 can enter an appropriate command through the entry device 103 so as to indicate to the central processing unit 106 that the input of data has been completed. Further, when appropriate, the operator 104 can then enter further commands through the manual entry device 103 into the central processing unit 106 which will cause the stored data to be transmitted to the central processing system 108 through the modems 110 and 114. Again, the particular operation sequence illustrated in FIG. 9 and described herein is merely a representative sequence of functions which can be utilized to allow the operator 104 to enter appropriate data into. the central processing unit 106. Numerous other procedures can be employed for entering such data without departing from the spirit and scope of the novel concepts of the invention.

Figure 11:
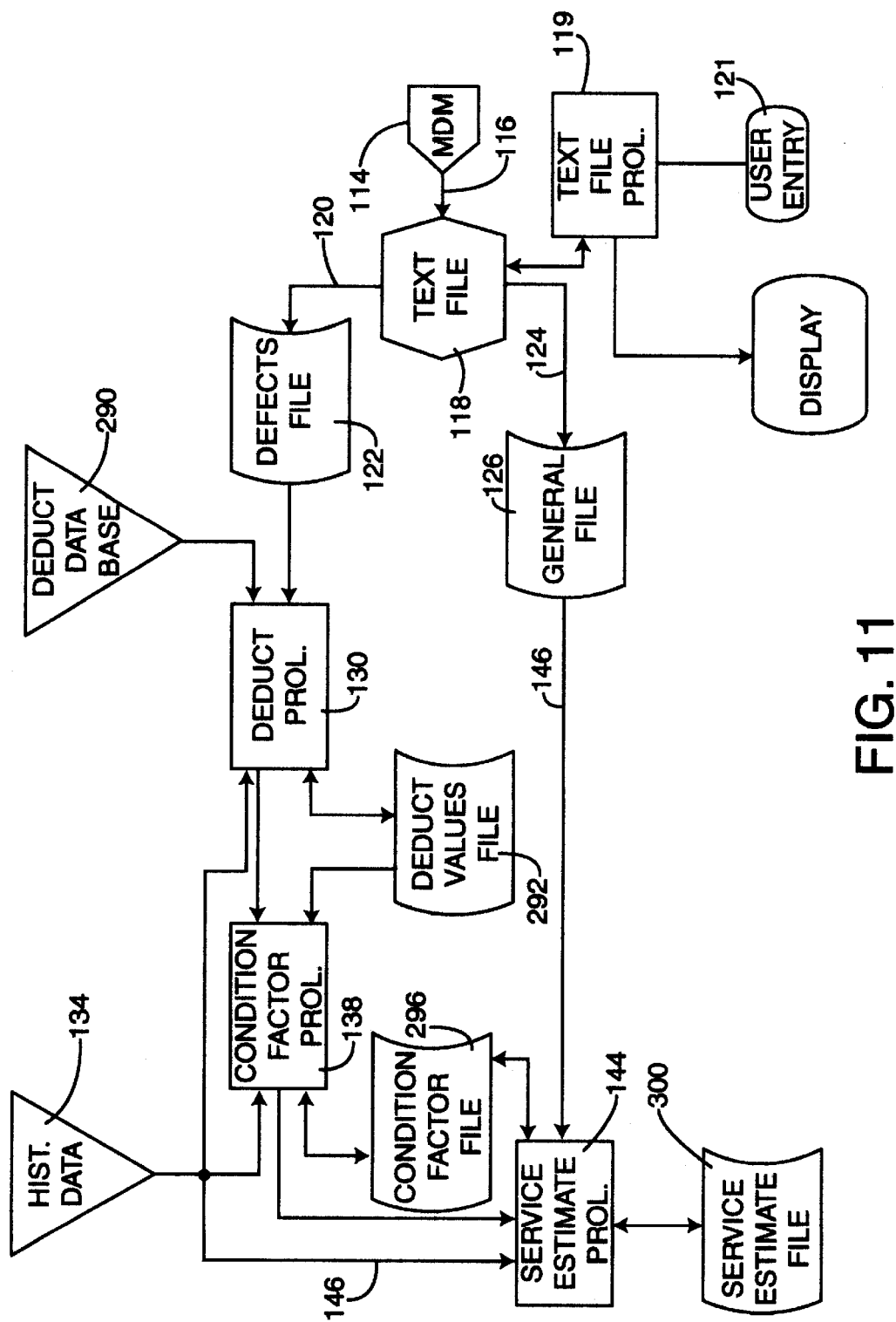
FIG. 11 is a symbolic block diagram of a portion of the central processing system of the asset management control system in accordance with the invention.

Referring now to FIGS. 1 and 11, and as earlier described herein, the modem 114 of the central processing system 108 is adapted to apply the data from the central processing unit 106 at the roof 102 facilities to a text file 118 over a transmission line or media represented as transmission line 116. The central processing system 108 is adapted to perform various functions associated with the asset management system 100 as described in subsequent paragraphs herein. For purposes of performance of these functions, various types of devices can be employed for the central processing system 108. For example, the processing system 108 can comprise any of a number of general purpose computers having appropriate processing capability and memory storage. As a more specific example, the central processing system 108 can be in the form of a programmable device such as the computer 246 illustrated in FIGS. 12 and 13.

Figure 12:
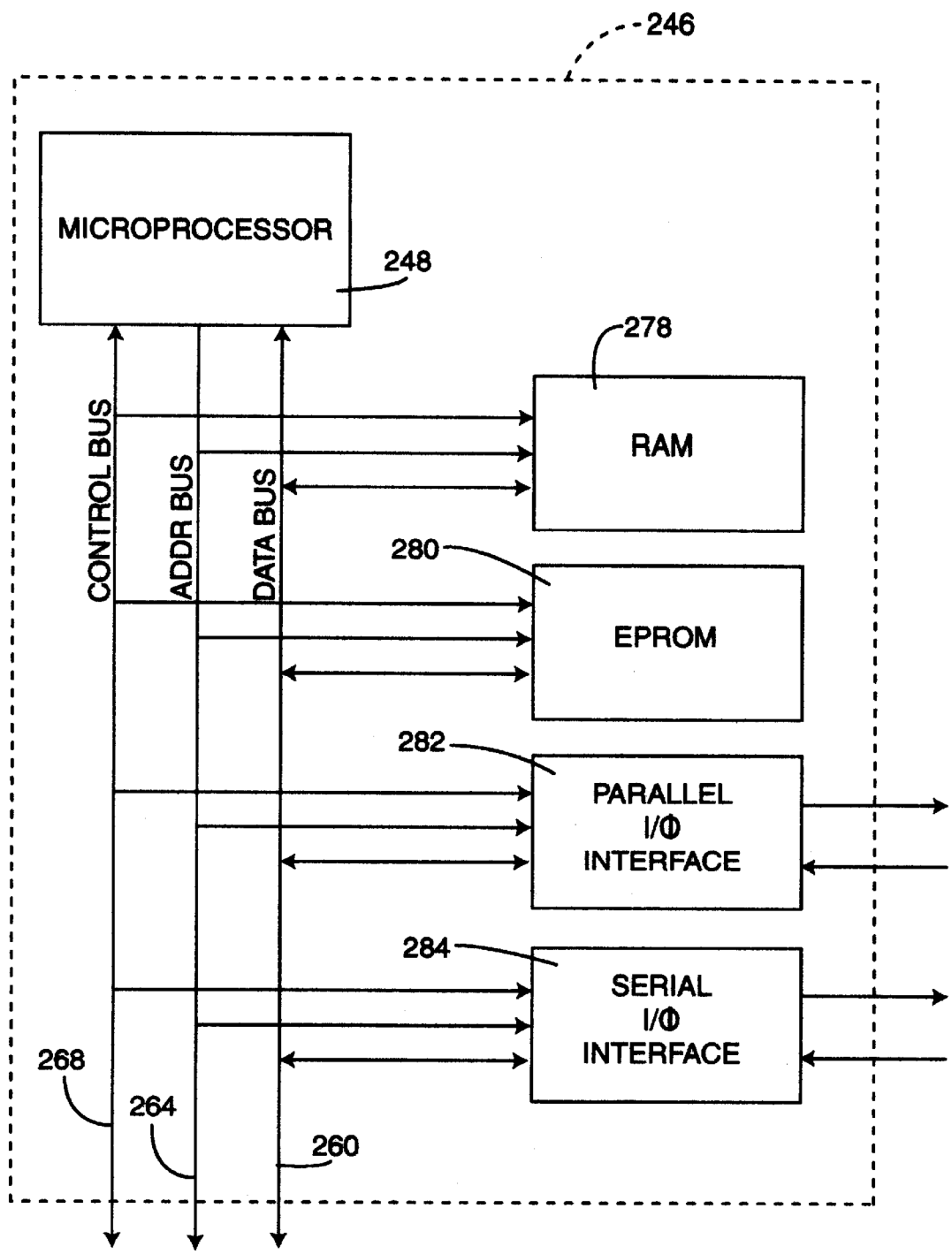
FIG. 12 is a block diagram of an exemplary computer processor and associated elements which may be used with the asset management control system in accordance with the invention.

As shown specifically in FIG. 12, the computer 246 can comprise a conventional microprocessor 248. Although various types of well known and commercially available devices can be employed for the microprocessor 248, one typical internal configuration of a microprocessor 248 is shown in FIG. 13 and a brief and simplistic description thereof will be provided.

Figure 13:
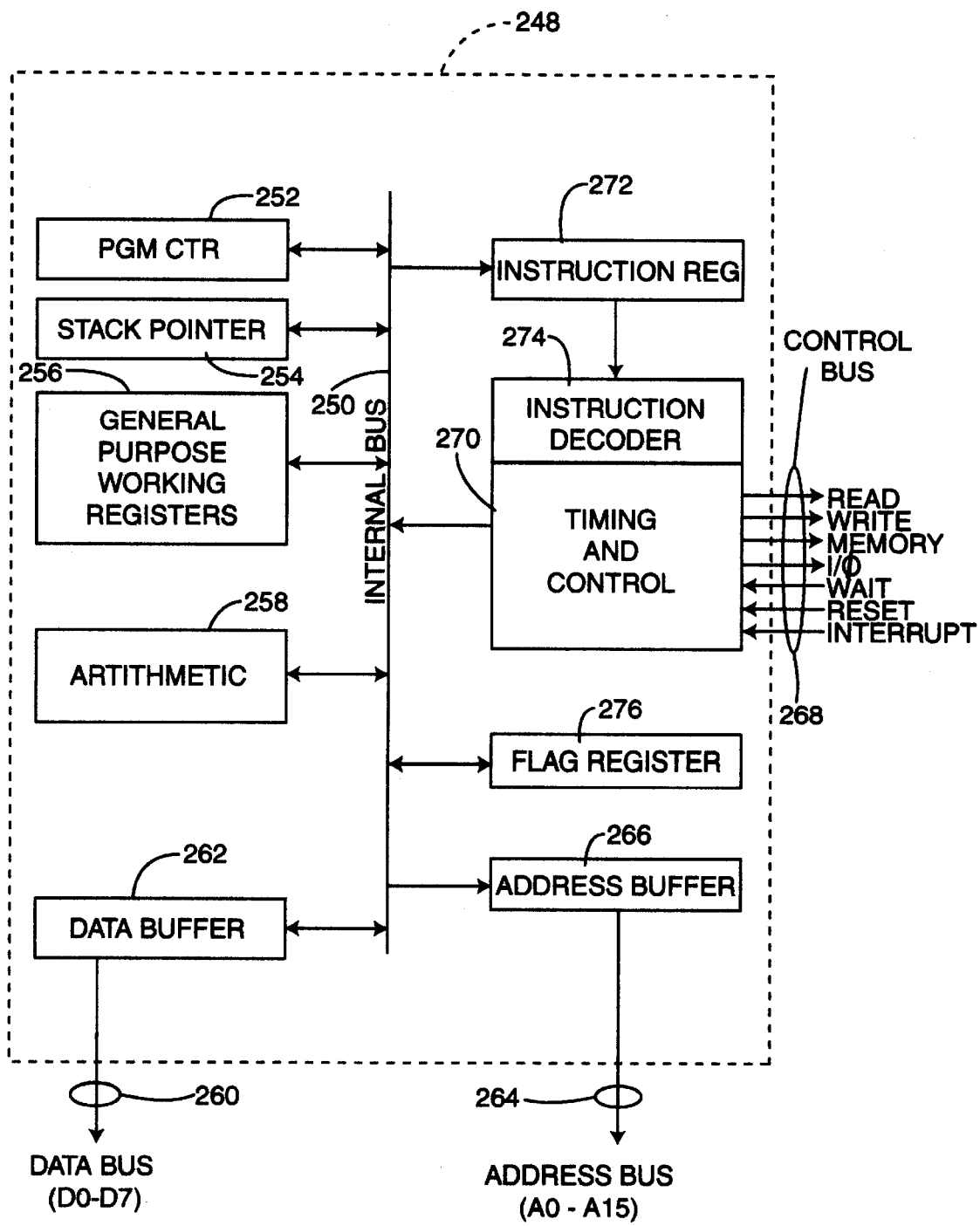
FIG. 13 is a block diagram of an exemplary microprocessor which may be utilized with the computer processor illustrated in FIG. 12.
Figure 15:
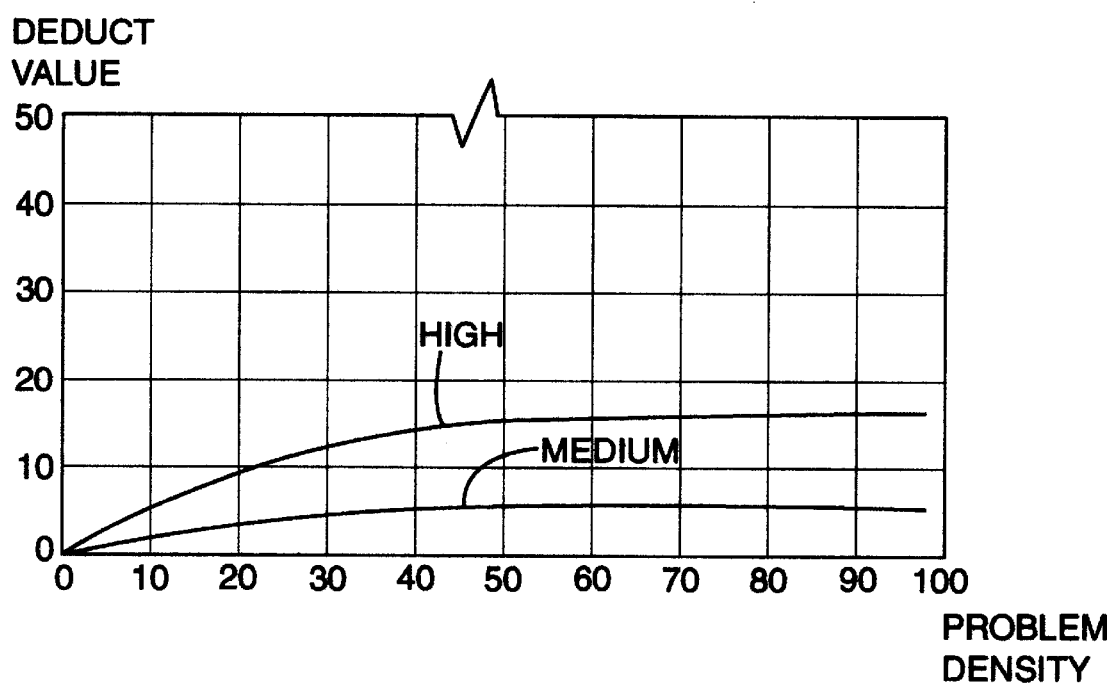
FIG. 15 is a graphical illustration of a functional relationship between a deduct value, severity level and problem density for a given problem type.
Figure 16:
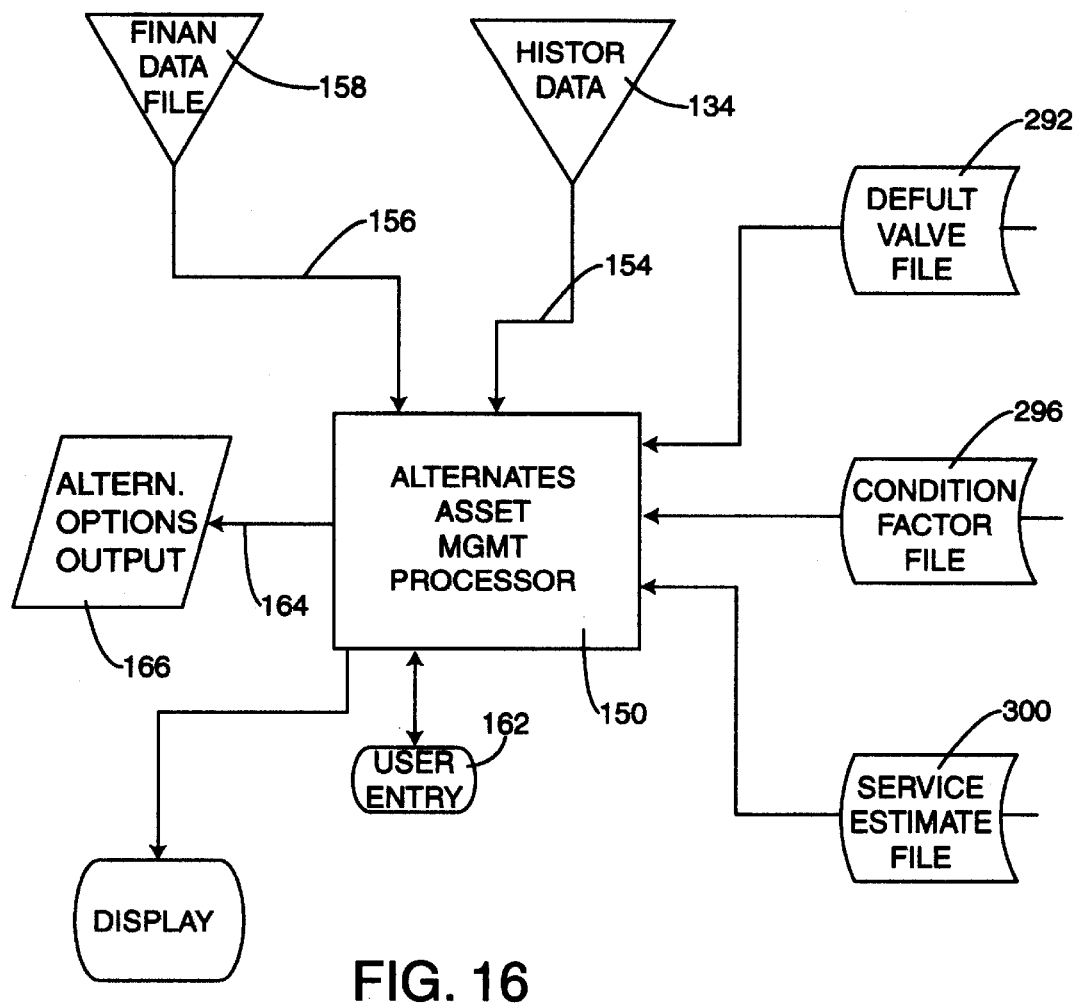
FIG. 16 is a symbolic block diagram showing a portion of the asset management control system in accordance with the invention.

Referring specifically to FIG. 13, the microprocessor 248 comprises an internal bus 250 which provides a means for bidirectional communication between conventional circuit components of the microprocessor 248. For example, signals can be transmitted to and received from a program counter 252, which comprise signals representative of the "next" instruction in the computer memory to be executed. Communication can also be provided between the internal bus 250 and microprocessor components such as the stack pointer 254, general purpose registers 256 and arithmetic unit 258. Each of these processor components is well known to those skilled in the art of internal computer system design.

The transmission and reception of data from memories and other components of the asset management control system is provided by the data bus 260 which is connected to the internal bus 250 through a conventional data buffer 262 so as to provide bidirectional communication therewith in the form of multi-digit parallel binary signals. The internal bus 250 is also connected to an address bus 264 through an address buffer 266. The microprocessor 248 can provide, for example, 16-bit parallel binary address signals on the bus 264 for directed communication between the microprocessor 248 and the various memories and other devices having signal communications through the data bus 260.

Conventional system control is provided by interconnection of the control bus 268 to timing and control circuitry 270. Communication signals from the conventional timing and control circuitry 270 can be applied to various components of the microprocessor 248 through the internal bus 250.

The microprocessor 248 also includes other conventional circuit components, including an instruction register 272. The instruction register 272 comprises a register to which the "next" instruction is stored for purposes of decoding and execution. The data within the instruction register 272 is applied to an instruction decoder 274 which comprises conventional circuitry for decoding the instruction data received from the next program location in memory. The microprocessor 248 can also include such conventional components as a flag register 276 utilized for various programming control within the processor 248.

The control bus 268 can be characterized as comprising a series of individual command signal leads. The signal leads include "transmitted" commands shown in FIG. 13 as the "read," "write," "memory" and "I/O" commands. In addition, the control bus 268 is adapted to apply certain "received" commands to the timing and control circuitry 270. These commands are symbolically shown in FIG. 13 as the "received," "wait," "reset" and "interrupt" commands.

The use of these commands is well known in the field of computer system design. For example, if data is to be read from a certain address location in a memory of the computer 246, "enable" signals can be applied to the "read" and "memory" command leads from the timing and control circuitry 270. Correspondingly, the address of the particular memory location to be read can be transmitted on address bus 264, while the data to be read from the particular memory location will be applied to the processor 248 on data bus 260. Similarly, when data is to be applied to a particular I/O device associated with the computer 246, "enable" signals can be applied on the "write" and "I/O" signal command leads from the timing and control circuitry 270. Correspondingly, the address designation of the I/O device can be applied on address bus 264, while the particular data to be transmitted to the I/O device can be applied on data bus 260. Again, the circuitry associated with microprocessor 248, and microprocessor 248 itself, are well known in the art. Any one of numerous commercially available microprocessors can be adapted for use as the microprocessor 248.

Turning again to FIG. 12, the asset management system control computer 246 includes memory storage elements, such as the random access memory (RAM) 278. The RAM 278 is conventional in design and includes memory locations wherein data may be stored and modified during execution of:program sequencing. Similarly, for storage of "permanent" data or instructions, wherein modifications must be made only occasionally, a conventional erasable-programmable read only memory (EPROM) 280 is also employed.

Both the RAM memory 278 and the EPROM memory 280 are interconnected with the microprocessor 248 so as to allow control and address location signals to be applied on the control bus 268 and address bus 264, respectively. In addition, for purposes of reading data from the memories into the microprocessor 248, and for writing data into the memories, bidirectional communication is established between the RAM memory 278, EPROM memory 280 and the microprocessor 248 through data bus 260.

For purposes of intercommunication with external devices, the control computer 246 also includes a parallel I/O interface module 282 and a serial I/O interface module 284. The parallel interface module 282 provides a means for transmitting and receiving data signals between the microprocessor 248 and external devices which generate and receive signals in parallel format. Correspondingly, the serial interface. module 284 is utilized to interface with external-devices in a serial format.

As with the RAM memory 278 and EPROM memory 280, the interface modules 282 and 284 are interconnected to the microprocessor 248 through the control bus 268 and address bus 248 for purposes of applying control and address information data signals, respectively, to each of the modules. In addition, the interface modules 282 and 284 are interconnected to the processor 248 through data bus 260 so that data signals are bidirectionally transferable between the modules 282, 284 and processor 248. It should be emphasized that the general circuitry of the computer 246 and the functional operations associated therewith are well known in the field of computer system design. Accordingly, any one of numerous commercially available computers can be adapted for use as computer 246.

Referring again to FIG. 11, it should be emphasized that FIG. 11 and other diagrams representing operations and devices associated with the asset management system 100 are somewhat "symbolic" in nature, and elements numerically referenced in these diagrams are in part structural and, in part, functional. That is, within certain of these diagrams, such as FIG. 11, "file" structures are shown as separate elements. However, such file elements actually represent memory storage locations within a random access or other type of memory associated with the central processing system 108. Correspondingly, certain elements of the exemplary illustrations, such as elements within FIG. 11, are identified as particular types of "processing modules" or "modules" or "processors." Such module or processor elements actually represent processes which can be performed by means of instructional sequences (i.e. computer programs) stored within read/write or read only memory elements of the central processing system 108. Still further, connecting lines referred to as "transmission lines" or the like within FIG. 11 and other diagrams substantially represent an interacting relationship between the connected elements. For example, where a connecting line may be shown between a processing module element and a file element, the connecting line represents the concept that the instructional sequences of the processing module act upon or otherwise utilize data within the file element. That is, the processing module may read from or write into memory locations of the file element.

As earlier described with respect to FIG. 11, the data representative of the condition of roof 102, along with data representative of generic information associated with roof 102, is applied through modem 114 to the text file 118 via transmission line 116. This data may be stored in the text file 118 in a conventional type of: format compatible with the central processing system 108, such as conventional "ASCII" or "EBCDIC" format. An exemplary printout of such data from the text file 118 is illustrated in FIG. 14.

When the data is stored in the text file 118, a user can be located at a conventional entry/display device 121 for purposes of reviewing the data in the text file 118 to correct data which may appear erroneous in any manner. The entry/display device 286 can be any conventional device, such as a keyboard and video display screen. Through the use of a text file correction processing module 119, the user can modify the data within the text file 118 as deemed appropriate to correct erroneous information. For example, during transmission of the data from the central processing unit 106 at the roof 102, an extraneous control character may have been entered into the text file 118. The user can delete the extraneous control character and perform any other text "editing" as required.

When the data representative of generic information and the condition of roof 102 appears to be in appropriate order within the text file 118, the text file processing module 119 can be utilized to transmit certain of the data within text file 118 to a generic file 126. The data stored in generic file 290 represents data indicative of generic information associated with the roof 102. For example, and as earlier described herein, such information may include the type of roof surface, type of membrane, type of insulation, roof slope and similar data.

Correspondingly, the text file processing module 119 can further be utilized to apply data representative of; the problem defects associated with roof 102 into the defects file 122 via transmission line 120. As earlier described, this data may comprise data indicative of a specific problem type, severity level associated with the problem and data representative of the problem density.

After the appropriate data has been stored in the defects file 122, the central processing system 108 is adapted to execute a sequence of instructions associated with the deduct processing module 130. The deduct processing module 130 is adapted to utilized data from the defects file 122 and data from a prestored deduct data base file 290 for purposes of generating a deduct value for each particular type of problem. These deduct values are stored in the deduct values file 292.

More specifically, the deduct value represents a figure of merit relating to the "impact" of a particular problem on the condition of the roof, given the particular problem type, severity level and problem density. That is, for any given type of problem defect, the higher the severity level and the higher the problem density, the greater will be the impact (and, therefore, the deduct value) of the problem on the condition of the roof 102. In general, the deduct database file 290 can comprise, for each particular type of problem, data representative of a deduct value as a function of the severity level of the problem and the problem density. Such data can be previously determined from "historical" data indicative of the historical impact of certain types of problems, severity levels and problem densities on the overall condition of a roof.

In determining the relationship between a deduct value and the severity level and problem density for a particular problem type, the functional relationship is likely to be nonlinear. Accordingly, the computation of a deduct value readily lends itself to the use of a computer having "curves" data stored in the deduct database file 290. That is, the relationship between a deduct value, the severity level and problem density for a particular type of problem defect can be characterized in a graphical manner by considering the deduct value to be the ordinate axis of a two dimensional X-Y Cartesian coordinate system, with the problem density being the abscissa. Correspondingly, the severity levels (i.e. low, high, medium,) can be characterized as a series of curves on the two dimensional system. By locating the particular curve associated with the severity level of the problem defect being considered, and the problem density of the particular problem, the deduct value can be obtained. Again, with this type of functional relationship between the deduct value and the severity levels and problem densities for a particular type of problem, the computation of the appropriate deduct value readily lends itself to use of curve data or tables stored within the deduct database file 290. An example of the relationship between a deduct value and the severity levels and problem densities for a particular problem type is graphically illustrated in FIG. 15.

When the deduct values for each of the individual problems discovered with respect to the condition of roof 102 have been stored in the deduct values file 292, a "total deduct value" can be obtained representative of the total of all of the deduct values of the individual problem defects. Thereafter, the central processing system 108 can be adapted to execute a "roof condition factor" processing module 138. The roof condition factor processing module 138 is adapted to utilize the total deduct values, historical and actuarial data from the data file 134 and other information associated with the roof 102 to generate a roof condition factor and store the same in roof condition factor file 296. In a manner somewhat similar to the computation of the deduct values, the roof condition factor processing module 138 generates a roof condition factor as a function of the total deduct value combined with other data having an impact on the overall condition of roof 102. For example, such additional data may include data associated with the age of roof 102, etc. Data from the historical database file 134 provides information regarding the functional relationship among the total deduct values, certain generic information associated with roof 102 and the roof condition factor. Also similar to the computation of the deduct values, the functional relationship between the roof condition factor and the total deduct value, given values of certain generic information associated with roof 102, can best be modeled as being nonlinear. Accordingly, such a computation readily lends itself to calculation by means of computer programs and "table" or "curved" data stored within computer databases.

For purposes of rating the condition of roof 102, the central processing system 108 is also adapted to execute programs which can be characterized as being within a "serviceability estimate" processing module 144. The processing module 144 is adapted to utilize the data from the generic file 126 and from the historical data file 134 for purposes of generating a "serviceability estimate" which is stored in the serviceability estimate file 300. The serviceability estimate can be characterized as a function of the roof condition factor stored in roof condition factor file 296, various generic information stored in generic file. 126 and historical data from the historical data file 134. As earlier described the serviceability estimate can be characterized as a representation of the anticipated useful life of the roof 102 beyond the time of rating. In particular, the serviceability estimate can be characterized as functionally related to the roof condition factor and the age of the roof.

In accordance with the foregoing, various "figures of merit" relating to the condition of the roof 102 can be determined. As examples in accordance with the invention with respect to the rating of roof 102, a serviceability estimate and roof condition factor can be determined. However, it should be emphasized that the description herein of a particular method of rating a roof 102 is merely exemplary of principles associated with the invention. This type of rating of a condition of an asset is, by no means, limited to roofs. That is, any type of physical asset which can lend itself to measurements (either manually or by instrumentation) representative of the condition of the asset can be, utilized in accordance with the invention.

Further in accordance with the invention, when the roof condition factor has been determined and stored in file 296 and the serviceability estimate has been determined and stored in file 300, the user can then employ programs embodied within the alternative asset management processing module 150 for purposes of determining the impact of various options which may be undertaken by the owner of roof 102 with respect to repairs and replacement. In accordance with the invention, the alternative asset management processing module 150 utilizes historical data from the data file 134, the roof-condition factor from file 296, the serviceability estimate from file 300 and various financial data from the financial data file 158. The financial data file 158 preferably includes data. representative of various repair costs, given specific information associated with roof 102 such as the particular types of problem defects, etc. In addition, however, the financial data file 158 would also include data required for purposes of more accurately determining costs of repairs, given the particular geographical location of the roof 102. That is, if the roof 102 were located in a metropolitan or otherwise highly urbanized area, it is possible that the "unit" cost of repairs may be relatively higher than would exist if the roof was located in a rural area or other area where labor costs and the like may be less.

With the financial data and other data obtained for the roof 102, in addition to the data from historical data file 134, the user can access the asset management processing module 150 through a manual entry device 162, for purposes of calculating costs to the owner of roof 102 based on various alternative repair and replacement options.

As a more specific example, the user can calculate, given the serviceability estimate and the financial data, the average annualized costs of replacing the roof at the end of its estimated remaining useful life. That is, the data from financial data file 158, along with the serviceability estimate for the roof 102, can be utilized to compute the estimated replacement cost at the end of the serviceable life of the roof 102. This replacement cost can be annualized, based on the serviceability estimate, costs of money and other data stored in the financial data file 158 and historical data file 134.

With the foregoing concept in mind, the user can further employ the alternative asset management processing module 150 to determine the financial impact of undertaking other repair and replacement options, relative to doing "nothing" other than replacing. the roof 102 at the end of its serviceable life. For example, certain types of problem defects can result in existing leak conditions. In many instances, the owner of the roof 102 may wish to undertake immediate repairs to correct the particular types of problem defects which are resulting in leak conditions. The user may thus request a recalculation of the roof condition factor and serviceability estimate, given the assumption that problem defects associated with roof 102 which result in current leak conditions have been repaired.

Presumably, such a recalculation will result in a lower roof condition factor (with the roof condition factor indicating a negative "impact" on the roof 102 as the condition factor increases) and a higher serviceability estimate. Further, the processing module 150 can be utilized with the financial data file 158 and historical data file 134 to generate data representative of the immediate repair costs to repair those problem defects currently resulting in leak conditions.

With the data representative of the adjusted roof condition factor and serviceability estimate, and with the data representative of the costs of these "emergency" repairs, calculations can be made which represent the differentials in annualized costs associated with the roof 102. Still further, and in accordance with the invention, the user can request re-evaluations of the roof condition factor and serviceability estimate based on other types of repairs being undertaken regarding the problem defects uncovered with roof 102. For example, the user may request a recalculation based on repairs of all flashing defects. The alternative asset management processing module 150 is adapted to recompute an adjusted roof condition factor and serviceability estimate, given such flashing repairs. In addition, the processing module 150 is also adapted to calculate the costs associated with such flashing repairs. With this data, a determination of the readjusted "value" of the roof 102, and the annualized costs of maintaining the roof 102 throughout its serviceable life can be determined. It is apparent that by undertaking a review of various repair and replacement options, the user can determine an optimum alternative, given the annualized costs of the various repair and replacement options.

In accordance with the foregoing, and in accordance with the invention, the user can essentially treat an asset of a physical plant, such as a roof, in the same manner as other types of financial assets. That is, the user can essentially "characterize" the physical plant asset as a possible cash flow, and determine savings and costs associated with undertaking various options: relating to repair and replacement of the asset. Stated relatively simply, the user can translate the physical condition of a component of a physical plant into a dollar value, by taking the current "condition" of the asset and essentially positioning it on a deterioration curve in a historical/actuarial table, based on historical data associated with similar assets.

It is apparent that the alternative asset management processing module 150 can be programmed to provide other useful date, given the data generated for the condition of the roof 102 as previously described herein. For example, the processing module 150 can be readily adapted to provide a "listing" or other identification of a number of roofs of a particular owner, with the listing identifying only those roofs having less than a predetermined number of serviceability years remaining. Further, other information can be provided in any manner deemed appropriate for the user. As an example, specifically relating to the roof 102, a "roof inventory record" could be generated by the alternative asset management processing module 150, with the inventory record comprising a display of various generic information, problem types and other information associated with the roof 102. In addition, such an inventory record may also include an indication of adjusted roof condition factors and serviceability estimates, given immediate repairs of problems causing existing leak conditions. An example of such a record display is shown in FIG. 17.

Again, it should be emphasized that the asset management system 100 in accordance with the invention is not in any manner limited to use for roof assets. The principles of the invention as described herein can be employed with any type of physical plant asset for which the condition of the asset can be determined by identifying problems or otherwise, quantifying the condition of the asset. For example, it will apparent to those skilled in the art that various other types of physical plant assets, such as furnaces, heating/ventilation systems and the like can be utilized with the principles associated with the invention. It will be further apparent to those skilled in the art that modifications and variations of the above described illustrative embodiment of the invention may be effected without departing from the spirit and scope of the novel concepts of the invention.

the embodiments of the invention in which an exclusive property or privilege is claimed are defined as follows:

1. An asset management system adapted to provide an analysis of the condition of a physical and structural asset, and allow a user to evaluate the effect of repair/replacement activities on said condition of said asset, said system comprising:

data entry means comprising a portable computer for entering data representative of problems or defects associated with said asset;

a first memory for receiving and storing said data representative of said problems or defects, and for receiving and storing data representative of generic information associated with said asset;

first processing means for processing said data representative of said problems or defects, and generating condition factor signals representative of a figure of merit of the condition of said asset;

second processing means for processing said data representative of said generic information, and generating serviceability estimate signals representative of the anticipated useful life of said asset, based upon said condition factor signals and said generic information;

a second memory for storing financial data representative of costs of repairs of defects of said asset, and replacements of said asset;

third processing means responsive to input data from said user and data stored in said first and said second memories for generating modified condition factor and serviceability estimate signals representative of a modified figure of merit of the condition of said asset and a modified anticipated useful life of said asset, based upon user input data representing an assumption of repairs of one or more defects of said asset, or based upon an assumption of replacement of said asset; and said third processing means further generates financial data signals representative of the monetary costs of said repairs of said asset, or said replacement of said asset, and a value as a monetary amount of said asset wherein said value will vary based upon a selection of said repairs or said replacement of said asset.

2. An asset management system in accordance with claim 1 characterized in that:

said asset comprises a roof of a physical structure; and said data entry means comprises a hand-held computer adapted for entry, storage and remote transmission of said data.

3. An asset management system in accordance with claim 2 characterized in that said data comprises:

general dimensions of said roof;

the type of surface of said roof; and the age of said roof.

4. An asset management system in accordance with claim 2 characterized in that said portable computer comprises means responsive to commands entered by an operator so as to transmit said data to said first memory.

* * * * *